United States Patent
Isago et al.

(10) Patent No.: US 10,889,714 B2
(45) Date of Patent: Jan. 12, 2021

(54) POLYPHENYLENE SULFIDE RESIN COMPOSITION AND MANUFACTURING METHOD OF THE SAME

(71) Applicant: Toray Industries, Inc., Tokyo (JP)

(72) Inventors: Hiroyuki Isago, Nagoya (JP); Tomoya Yoshida, Nagoya (JP); Kei Saitoh, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 291 days.

(21) Appl. No.: 16/072,024

(22) PCT Filed: Jan. 25, 2017

(86) PCT No.: PCT/JP2017/002541
§ 371 (c)(1),
(2) Date: Jul. 23, 2018

(87) PCT Pub. No.: WO2017/131028
PCT Pub. Date: Aug. 3, 2017

(65) Prior Publication Data
US 2019/0040256 A1 Feb. 7, 2019

(30) Foreign Application Priority Data

Jan. 26, 2016 (JP) .................. 2016-012272
Aug. 29, 2016 (JP) .................. 2016-166791

(51) Int. Cl.
| | |
|---|---|
| C08L 81/04 | (2006.01) |
| C08J 3/20 | (2006.01) |
| C08J 3/00 | (2006.01) |
| C08L 81/02 | (2006.01) |
| C08L 23/08 | (2006.01) |
| C08L 27/18 | (2006.01) |
| C08L 27/20 | (2006.01) |
| C08J 3/12 | (2006.01) |
| C08K 5/5455 | (2006.01) |

(52) U.S. Cl.
CPC ............... C08L 81/04 (2013.01); C08J 3/005 (2013.01); C08J 3/20 (2013.01); C08J 3/201 (2013.01); C08L 23/0892 (2013.01); C08L 27/18 (2013.01); C08L 27/20 (2013.01); C08L 81/02 (2013.01); C08J 3/12 (2013.01); C08J 2327/18 (2013.01); C08J 2327/20 (2013.01); C08J 2381/04 (2013.01); *C08J 2427/18* (2013.01); *C08J 2481/04* (2013.01); *C08K 5/5455* (2013.01)

(58) Field of Classification Search
CPC ...... C08L 81/04; C08L 81/02; C08L 23/0892; C08L 27/18; C08L 27/20; C08J 3/201; C08J 3/005; C08J 3/20
See application file for complete search history.

(56) References Cited

U.S. PATENT DOCUMENTS

| | | | |
|---|---|---|---|
| 6,121,353 | A | 9/2000 | Umino et al. |
| 2013/0196104 | A1 | 8/2013 | Matsumoto et al. |
| 2015/0361265 | A1 | 12/2015 | Isago et al. |

FOREIGN PATENT DOCUMENTS

| | | |
|---|---|---|
| CN | 103154140 A | 6/2013 |
| CN | 104919004 A | 9/2015 |
| JP | 03-263464 A | 11/1991 |
| JP | 04-132765 A | 5/1992 |
| JP | 08-53592 A | 2/1996 |
| JP | 08-176390 A | 7/1996 |
| JP | 09-263676 A | 10/1997 |
| JP | 11-279405 A | 10/1999 |
| JP | 2000-129585 A | 5/2000 |
| JP | 2010-195853 A | 9/2010 |
| JP | 2012-072221 A | 4/2012 |
| JP | 2015-038191 A | 2/2015 |
| JP | 2015-110732 A | 6/2015 |
| JP | 2016-027147 A | 2/2016 |
| WO | 98/21277 A1 | 5/1998 |
| WO | 2012/053505 A1 | 4/2012 |
| WO | 2014/115536 A1 | 7/2014 |

OTHER PUBLICATIONS

The Extended European Search Report dated Aug. 22, 2019, of counterpart European Application No. 17744258.9.

*Primary Examiner* — Peter D. Mulcahy
(74) *Attorney, Agent, or Firm* — DLA Piper LLP (US)

(57) ABSTRACT

A polyphenylene sulfide resin composition is obtained by mixing a polyphenylene sulfide resin (a), a fluororesin (b) and an organosilane compound (c). When a resin phase-separated structure of a molded product formed from the polyphenylene sulfide resin composition is observed by an electron microscope, the component (a) forms a continuous phase, the component (b) forms a primary dispersed phase having a number-average dispersion diameter of not greater than 1 μm, and a secondary dispersed phase of the component (a) is included in the primary dispersed phase of the component (b).

20 Claims, No Drawings

POLYPHENYLENE SULFIDE RESIN COMPOSITION AND MANUFACTURING METHOD OF THE SAME

TECHNICAL FIELD

This disclosure relates to a polyphenylene sulfide resin composition having excellent toughness, weld characteristics, heat resistance and surface smoothness and a manufacturing method of the same.

BACKGROUND

Polyphenylene sulfide (hereinafter abbreviated as "PPS") resin is an engineering plastic having, for example, excellent heat resistance, flame retardance, chemical resistance, electrical insulation property, moist heat resistance, mechanical strength and dimensional stability. The PPS resin may be molded into, for example, various molded products, fibers and films by various molding techniques such as injection molding and extrusion molding. The PPS resin is accordingly in practical use in a wide range of fields including electric and electronic components, mechanical components and automobile components. Compared to other engineering plastics such as polyamide, however, the PPS resin has a problem of lower toughness represented by, for example, rupture elongation in a tensile test. A large number of methods have been reported to improve the toughness by mixing an elastomer with the PPS resin to provide flexibility. Such modified PPS resins, however, cause deterioration of the excellent heat resistance and chemical resistance which the PPS resin inherently has.

The fluororesin generally has excellent chemical resistance, flame retardance, weather resistance, nonadherent property, mold releasability, heat resistance, sliding property and electrical properties. The fluororesin has lower elastic modulus and flexibility, compared to the engineering plastics.

Various proposals have been made to mix the fluororesin with the PPS resin to give various characteristics not achievable by the single body. The fluororesin is, however, characterized by its small surface free energy and accordingly has poor interfacial adhesion in generation of a polymer alloy with another resin. It is accordingly difficult to provide sufficient mechanical properties to the resulting alloy.

For example, JP H03-263464 A has proposed an improvement in the compatibility of the PPS resin with two or more components of fluororesins by the following procedure to improve various characteristics and the appearance. The procedure melt kneads the two or more components of fluororesins and further kneads the fluororesins with the PPS resin at a temperature equal to or lower than the melting point of one component of fluororesin to form a dispersed phase of the fluororesins in a PPS resin phase. The procedure subsequently disperses the fluororesin component that is not melted during kneading, into the dispersed phase in a core shell form. This improves the compatibility of the PPS resin with the two or more components of fluororesins and thereby improves the various characteristics and the appearance. International Publication 1998/21277 A has proposed a polymer alloy having good mechanical properties. That polymer alloy is obtained by adding an ethylene tetrafluoroethylene copolymer having a low melting point and a high melt viscosity and a compatibilizer to the PPS resin to provide a micro dispersion of the ethylene tetrafluoroethylene copolymer and the PPS resin.

International Publication 2014/115536 A has proposed a polymer alloy obtained by melt kneading a melt processable fluororesin and a PPS resin by using a twin-screw extruder with a notch-type stirring screw. That polymer alloy has a phase-separated structure that includes a secondary dispersed phase formed in a primary dispersed phase.

WO '536 controls the phase-separated structure such that the PPS resin forms a continuous phase, the fluororesin forms a primary dispersed phase, and a secondary dispersed phase of a component other than the fluororesin is formed in the primary dispersed phase to provide the good electrical properties. JP 2015-110732 A, on the other hand, forms an alloy of the PPS resin with a functional group-containing fluororesin to stabilize the phase-separated structure in melt retention. The PPS resin composition proposed in JP '732 has excellent flexibility, heat resistance, creep resistance and electrical insulation property.

As described in JP '464, a relatively low content of the fluororesin provides the good appearance, but a high content of the fluororesin does not provide good compatibility and accordingly provides poor appearance. Even the low content of the fluororesin does not provide a sufficiently fine dispersion and causes deterioration of the mechanical properties and the like. This is because the dispersion particle diameter of the fluororesin in a core portion of the core shell-form dispersion structure is expected to be 5 to 50 μm.

WO '277 improves the dispersibility of the fluororesin to provide the dispersion diameter of less than 1 μm. That improves the mechanical properties, but does not provide sufficient toughness. Additionally, WO '277 includes no description with regard to formation of a secondary dispersed phase in the primary dispersed phase formed by the fluororesin.

The resin composition described in WO '536 has a coarse structure having the dispersion diameter of the primary dispersed phase of greater than several μm. This causes a difficulty in providing the excellent toughness such as tensile elongation.

Furthermore, the resin composition described in JP '732 has the primary dispersed phase of a coarse dispersion diameter. This causes a difficulty in providing the excellent toughness. Additionally, JP '732 includes no description with regard to formation of a secondary dispersed phase.

It could therefore be helpful to provide a PPS resin composition having excellent toughness (tensile elongation), weld characteristics, and surface smoothness without damaging various characteristics such as excellent heat resistance and chemical resistance which the PPS resin inherently has.

SUMMARY

We found that the following controls result in a PPS resin composition including a PPS resin, a fluororesin and an organosilane compound and has various characteristics. Controlling the phase-separated structure such that the fluororesin included in the composition forms a primary dispersed phase having a number-average dispersion diameter of not greater than 1 μm and that a secondary dispersed phase of the PPS resin is formed in the fluororesin phase, provides a PPS resin composition having excellent heat resistance, chemical resistance, toughness, weld characteristics, and surface smoothness.

We thus provide:
(1) A polyphenylene sulfide resin composition obtained by mixing a polyphenylene sulfide resin (a), a fluororesin (b) and an organosilane compound (c). When a resin phase-separated structure of a molded product formed from the polyphenylene sulfide resin composition is observed by an electron microscope, the component (a) forms a continuous phase, the component (b) forms a primary dispersed phase having a number-average dispersion diameter of not greater than 1 μm, and a secondary dispersed phase of the component (a) is included in the primary dispersed phase of the component (b).

The polyphenylene sulfide resin composition described in (1) is the PPS resin composition having excellent heat resistance, chemical resistance, toughness, weld characteristics and surface smoothness.

(2) In the polyphenylene sulfide resin composition described in (1), the component (b) may be a reactive functional group-containing fluororesin.

In the polyphenylene sulfide resin composition described in (2), the fluororesin contains the reactive functional group. This is likely to accelerate the reaction of forming an intermolecular bond between the fluororesin and the PPS resin or forming an intermolecular bond between the fluororesin and the organosilane compound.

(3) In the polyphenylene sulfide resin composition described in either (1) or (2), the component (b) may be an ethylene tetrafluoroethylene copolymer.

In the polyphenylene sulfide resin composition described in (3), the fluororesin is the ethylene tetrafluoroethylene copolymer. This enables the mixture to be melt kneaded at a temperature that does not cause degradation of the PPS resin and thereby prevents deterioration of the mechanical properties.

(4) In the polyphenylene sulfide resin composition described in any of (1) to (3), the component (a) may be a carboxyl group-containing polyphenylene sulfide resin having a content of a carboxyl group in a range of not lower than 25 μmol/g and not higher than 400 μmol/g.

The polyphenylene sulfide resin composition described in (4) prevents an increase in amount of volatile component in the manufacturing process, while preventing reduction of the interaction between the PPS resin and the fluororesin. This facilitates providing a desired PPS resin composition.

(5) In the polyphenylene sulfide resin composition described in any of (1) to (4), the component (a) may haves a weight-average molecular weight in a range of not less than 30000 and not greater than 150000.

The polyphenylene sulfide resin composition described in (5) prevents a significant increase in melt viscosity, while preventing deterioration of the inherent mechanical properties of the PPS resin. This facilitates providing a desired PPS resin composition.

(6) In the polyphenylene sulfide resin composition described in any of (1) to (5), the component (c) may be an isocyanate group-containing organosilane compound.

In the polyphenylene sulfide resin composition described in (6), the organosilane compound contains the isocyanate group. This is likely to accelerate the reaction of forming an intermolecular bond between the organosilane compound and the PPS resin or forming an intermolecular bond between the organosilane compound and the fluororesin.

(7) A manufacturing method of the polyphenylene sulfide resin composition described in any of (1) to (6) kneads the component (a), the component (b) and the component (c) using a twin-screw extruder that has a ratio of a total length of elongational flow zones for melt kneading with elongational flow to an overall length of a screw of the twin-screw extruder in a range of not lower than 3% and not higher than 20%.

The polyphenylene sulfide resin composition described in (7) prevents excessive heat generation, while providing the sufficient dispersion efficiency for the resins to be kneaded. This accordingly facilitates providing a desired PPS resin composition.

(8) In the manufacturing method of the polyphenylene sulfide resin composition described in (7), a difference between a pressure difference before the elongational flow zone and a pressure difference in the elongational flow zone may be not lower than 10 kg/cm$^2$ and not higher than 1000 kg/cm$^2$.

The polyphenylene sulfide resin composition described in (8) readily forms the elongational flow in the elongational flow zone and prevents unevenness of the pressure distribution. This also prevents an excessive increase in back pressure in the extruder. This accordingly facilitates providing a desired PPS resin composition.

We thus provide a PPS resin composition having excellent heat resistance, chemical resistance, toughness, weld characteristics and surface smoothness by the phase-separated structure configured such that the PPS resin forms a continuous phase, that the fluororesin forms a primary dispersed phase having the number-average dispersion diameter of not greater than 1 and that the PPS resin forms a secondary dispersed phase in the primary dispersed phase.

DETAILED DESCRIPTION

The following describes examples of our compositions and methods in detail.

(1) Polyphenylene Sulfide Resin (a)

A PPS resin (a) is a polymer having a repeating unit expressed by a structural formula below:

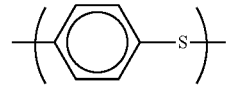

and is preferably a polymer including not lower than 70 mol % or more specifically not lower than 90 mol % of the polymer having the repeating unit expressed by the above structural formula from the viewpoint of heat resistance. The PPS resin (a) may be configured such that approximately lower than 30 mol % of the repeating unit may be a repeating unit expressed by any of structures below:

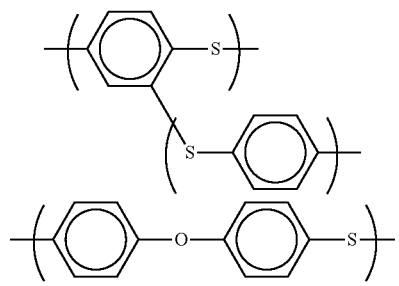

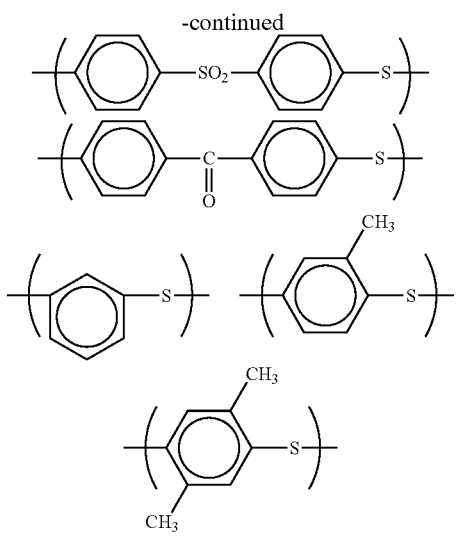

A PPS copolymer partly having such a configuration tends to have a lower melting point. Such a resin composition is accordingly advantageous in moldability.

There is no specific limitation in weight-average molecular weight of the PPS resin (a). With a view to providing the better mechanical properties, the weight-average molecular weight of the PPS resin is preferably not lower than 30000. The weight-average molecular weight of the PPS resin is preferably not lower than 40000 and more preferably not lower than 45000. The weight-average molecular weight of the PPS resin is furthermore preferably not lower than 50000. The weight-average molecular weight of the PPS resin is also preferably not higher than 150000. The weight-average molecular weight of the PPS resin is preferably not higher than 130000 and more preferably not higher than 90000. The weight-average molecular weight of the PPS resin is furthermore preferably not higher than 70000. The low weight-average molecular weight provides the low mechanical properties of the PPS resin so that the weight-average molecular weight of not lower than 30000 is preferable. The weight-average molecular weight of higher than 150000, on the other hand, provides extremely high melt viscosity. This is an undesirable tendency in molding process.

The weight-average molecular weight may have a value calculated in polystyrene conversion by gel permeation chromatography (GPC) using an apparatus manufactured by Senshu Scientific Co., Ltd.

A manufacturing method of the PPS resin (a) is described below. The manufacturing method is, however, not limited to the method described below, but may be any method that produces the PPS resin (a) of the above configuration.

The following first describes the details of a polyhalogenated aromatic compound, a sulfidizing agent, a polymerization solvent, a molecular weight modifier, a polymerization modifier and a polymerization stabilizer.

Polyhalogenated Aromatic Compound

The polyhalogenated aromatic compound is a compound having two or more halogen atoms in one molecular. Concrete examples of the polyhalogenated aromatic compound include p-dichlorobenzene, m-dichlorobenzene, o-dichlorobenzene, 1,3,5-trichlorobenzene, 1,2,4-trichlorobenzene, 1,2,4,5-tetrachlorobenzene, hexachlorobenzene, 2,5-dichlorotoluene, 2,5-dichloro-p-xylene, 1,4-dibromobenzene, 1,4-diiodobenzene, 1-methoxy-2,5-dichlorobenzene. Preferably p-dichlorobenzene is used as the polyhalogenated aromatic compound. With a view to introducing a carboxyl group, a preferable aspect uses a carboxyl group-containing dihalogenated aromatic compound such as 2,4-dichlorobenzoic acid, 2,5-dichlorobenzoic acid, 2,6-dichlorobenzoic acid or 3,5-dichlorobenzoic acid or their mixture as a copolymerization monomer. Two or more different types of polyhalogenated aromatic compounds may be used in combination to form a copolymer. In this case, it is preferable to use a p-dihalogenated aromatic compound as a primary component.

The amount of the polyhalogenated aromatic compound is preferably not less than 0.9 mol and more preferably not less than 0.95 mol per 1 mol of the sulfidizing agent, with a view to obtaining the PPS resin (a) having the viscosity suitable for processing. The amount of the polyhalogenated aromatic compound is furthermore preferably not less than 1.005 mol per 1 mol of the sulfidizing agent. The amount of the polyhalogenated aromatic compound is preferably not greater than 2.0 mol and more preferably not greater than 1.5 mol per 1 mol of the sulfidizing agent. The amount of the polyhalogenated aromatic compound is furthermore preferably not greater than 1.2 mol per 1 mol of the sulfidizing agent.

Sulfidizing Agent

The sulfidizing agent may be, an alkali metal sulfide, an alkali metal hydrosulfide or hydrogen sulfide.

Concrete examples of the alkali metal sulfide include lithium sulfide, sodium sulfide, potassium sulfide, rubidium sulfide, cesium sulfide and mixtures of two or more of these sulfides. Among these alkali metal sulfides, sodium sulfide is used preferably. Any of these alkali metal sulfides may be used in the form of a hydrate or an aqueous mixture or in the form of an anhydride.

Concrete examples of the alkali metal hydrosulfide include sodium hydrosulfide, potassium hydrosulfide, lithium hydrosulfide, rubidium hydrosulfide, cesium hydrosulfide and mixtures of two or more of these hydrosulfides. Among these alkali metal hydrosulfides, sodium hydrosulfide is used preferably. Any of these alkali metal hydrosulfides may be used in the form of a hydrate or an aqueous mixture or in the form of an anhydride.

The sulfidizing agent used may be an alkali metal sulfide prepared in situ in a reaction system from an alkali metal hydrosulfide and an alkali metal hydroxide. The sulfidizing agent used may also be an alkali metal sulfide that is prepared from an alkali metal hydrosulfide and an alkali metal hydroxide and transferred to a polymerization tank.

The sulfidizing agent used may be an alkali metal sulfide prepared in situ in a reaction system from an alkali metal hydroxide such as lithium hydroxide or sodium hydroxide and hydrogen sulfide. The sulfidizing agent used may also be an alkali metal sulfide that is prepared from an alkali metal hydroxide such as lithium hydroxide or sodium hydroxide and hydrogen sulfide and transferred to a polymerization tank.

When there is a partial loss of the sulfidizing agent due to a dehydration operation or the like prior to start of a polymerization reaction, the amount of the sulfidizing agent used means a remaining amount calculated by subtracting the loss from an actual use amount.

An alkali metal hydroxide and/or an alkaline earth metal hydroxide may be used in combination with the sulfidizing agent. Concrete examples of the alkali metal hydroxide preferably used include sodium hydroxide, potassium hydroxide, lithium hydroxide, rubidium hydroxide, cesium hydroxide and mixtures of two or more of these hydroxides.

Concrete examples of the alkaline earth metal hydroxide include calcium hydroxide, strontium hydroxide and barium hydroxide. Among these hydroxides, sodium hydroxide is used preferably.

When an alkali metal hydrosulfide is used as the sulfidizing agent, it is preferable to use an alkali metal hydroxide simultaneously. The amount of the alkali metal hydroxide is preferably not less than 0.95 mol and more preferably not less than 1.00 mol per 1 mol of the alkali metal hydrosulfide. The amount of the alkali metal hydroxide is furthermore preferably not less than 1.005 mol per 1 mol of the alkali metal hydrosulfide. The amount of the alkali metal hydroxide is preferably not greater than 1.20 mol and more preferably not greater than 1.15 mol per 1 mol of the alkali metal hydrosulfide. The amount of the alkali metal hydroxide is furthermore preferably not greater than 1.10 mol per 1 mol of the alkali metal hydrosulfide.

Polymerization Solvent

It is preferable to use an organic polar solvent as the polymerization solvent. Concrete examples include N-alkyl pyrrolidones such as N-methyl-2-pyrrolidone and N-ethyl-2-pyrrolidone, caprolactams such as N-methyl-ε-caprolactam, aprotic organic solvents such as 1,3-dimethyl-2-imidazolidinone, N,N-dimethylacetamide, N,N-dimethylformamide, hexamethyl-phosphoric triamide, dimethylsulfone, and tetramethylene sulfoxide and mixtures thereof. All these organic polar solvents have high reaction stability and are thus preferably used. Among these organic polar solvents, especially N-methyl-2-pyrrolidone (hereinafter may be abbreviated as NMP) is used preferably.

The amount of the organic polar solvent is preferably not less than 2.0 mol and more preferably not less than 2.25 mol per 1 mol of the sulfidizing agent. The amount of the organic polar solvent is furthermore preferably not less than 2.5 mol per 1 mol of the sulfidizing agent. The amount of the organic polar solvent is preferably not greater than 10 mol and more preferably not greater than 6.0 mol per 1 mol of the sulfidizing agent. The amount of the organic polar solvent is furthermore preferably not greater than 5.5 mol per 1 mol of the sulfidizing agent.

Molecular Weight Modifier

For example, with a view to forming a terminal of the PPS resin (a) produced or regulating the polymerization reaction or the molecular weight, a monohalogen compound (not necessarily aromatic compound) may be used in combination with the polyhalogenated aromatic compound described above.

Polymerization Modifier

One preferable aspect uses a polymerization modifier, with a view to obtaining the PPS resin (a) of a relatively high degree of polymerization in a shorter time period. The polymerization modifier denotes a substance serving to increase the viscosity of the PPS resin (a) obtained. Concrete examples of this polymerization modifier include organic carboxylates, water, alkali metal chlorides, organic sulfonates, alkali metal sulfates, alkaline earth metal oxides, alkali metal phosphates and alkaline earth metal phosphates. Any of these compounds may be used alone, or two or more different types of these compounds may be used simultaneously. Among them, organic carboxylates, water and alkali metal chlorides are preferable. Alkali metal carboxylates are preferable as the organic carboxylate, and lithium chloride is preferable as the alkali metal chloride.

The alkali metal carboxylate is a compound expressed by a general formula $R(COOM)_n$ (where R represents an alkyl group, a cycloalkyl group, an aryl group, an alkyl aryl group or an aryl alkyl group having 1 to 20 carbon atoms, M represents an alkali metal selected among lithium, sodium, potassium, rubidium and cesium, and n denotes an integral number of 1 to 3.) The alkali metal carboxylate may be used in the form of a hydrate, an anhydride or an aqueous solution. Concrete examples of the alkali metal carboxylate include lithium acetate, sodium acetate, potassium acetate, sodium propionate, lithium valerate, sodium benzoate, sodium phenylacetate, potassium p-toluate, and mixtures thereof.

The alkali metal carboxylate may be formed by addition and reaction of approximate equal chemical equivalents of an organic acid and one or more compounds selected from the group consisting of alkali metal hydroxides, alkali metal carbonates and alkali metal bicarbonates. Among the above alkali metal carboxylates, the lithium salt has high solubility in the reaction system and the significant synergism but is expensive. The potassium salt, the rubidium salt and the cesium salt are expected to have insufficient solubilities in the reaction system. Accordingly, sodium acetate that is inexpensive and has moderate solubility in the polymerization system is preferably used as the alkali metal carboxylate.

The amount of the alkali metal carboxylate used as the polymerization modifier is generally preferably not less than 0.01 mol per 1 mol of the alkali metal sulfide used, and more preferably not less than 0.1 mol and furthermore preferably not less than 0.2 mol with a view to providing the higher degree of polymerization. The amount of the alkali metal carboxylate used as the polymerization modifier is generally preferably not greater than 2 mol per 1 mol of the alkali metal sulfide used, and more preferably not greater than 0.6 mol and furthermore preferably not greater than 0.5 mol with a view to providing the higher degree of polymerization.

The added amount of water used as the polymerization modifier is generally preferably not less than 0.3 mol per 1 mol of the alkali metal sulfide used, and more preferably not less than 0.6 mol and furthermore preferably not less than 1.0 mol with a view to providing the higher degree of polymerization. The added amount of water used as the polymerization modifier is generally preferably not greater than 15 mol per 1 mol of the alkali metal sulfide used, and more preferably not greater than 10 mol and furthermore preferably not greater than 5 mol with a view to providing the higher degree of polymerization.

Two or more different types of these polymerization modifiers may be used in combination. For example, using the alkali metal carboxylate and water in combination increases the molecular weight by the smaller use amount, compared to using the alkali metal carboxylate alone or using water alone as the polymerization modifier.

The timing of addition of any of these polymerization modifiers is not especially specified. The polymerization modifier may be added any time, for example, in preliminary process, on start of polymerization or during polymerization described later or may be added divisionally in multiple times. When the alkali metal carboxylate is used as the polymerization modifier, from the viewpoint of the easiness of addition, it is more preferable to add the alkali metal carboxylate simultaneously on start of preliminary process or on start of polymerization. When water is used as the polymerization modifier, it is effective to add water in the middle of polymerization reaction after addition of the polyhalogenated aromatic compound.

Polymerization Stabilizer

A polymerization stabilizer may be used to stabilize the polymerization reaction system and prevent side reactions.

The polymerization stabilizer contributes to stabilize the polymerization reaction system and suppress undesired side reactions. One example of the side reaction is generation of thiophenol. Addition of the polymerization stabilizer suppresses generation of thiophenol. Concrete examples of the polymerization stabilizer may be compounds such as alkali metal hydroxides, alkali metal carbonates, alkaline earth metal hydroxides and alkaline earth metal carbonates. Among them, alkali metal hydroxides such as sodium hydroxide, potassium hydroxide and lithium hydroxide are preferable as the polymerization stabilizer. The alkali metal carboxylate described above also works as the polymerization stabilizer and may thus be one of the polymerization stabilizers. When the alkali metal hydrosulfide is used as the sulfidizing agent, it is especially preferable to use the alkali metal hydroxide simultaneously as described above. An excess of the alkali metal hydroxide relative to the sulfidizing agent may also work as the polymerization stabilizer.

Any of these polymerization stabilizers may be used alone, or two or more different types of these polymerization stabilizers may be used in combination. The ratio of the polymerization stabilizer is generally preferably not less than 0.02 mol and more preferably not less than 0.03 mol per 1 mol of the alkali metal sulfide used. The ratio of the polymerization stabilizer is furthermore preferably not less than 0.04 mol per 1 mol of the alkali metal sulfide used. The ratio of the polymerization stabilizer is generally preferably not greater than 0.2 mol and more preferably not greater than 0.1 mol per 1 mol of the alkali metal sulfide used. The ratio of the polymerization stabilizer is furthermore preferably not greater than 0.09 mol per 1 mol of the alkali metal sulfide used. The excessively low ratio tends to provide the insufficient stabilization effect. The excessively high ratio is, on the other hand, economically disadvantageous and tends to decrease the polymer yield.

The timing of addition of the polymerization stabilizer is not especially specified. The polymerization stabilizer may be added any time, for example, in preliminary process, on start of polymerization or during polymerization described later or may be added divisionally in multiple times. From the viewpoint of the easiness of addition, it is more preferable to add polymerization stabilizer simultaneously on start of preliminary process or on start of polymerization.

The following concretely describes a preliminary process, a polymerization reaction process, a recovery process and a post treatment process in this sequence in a preferable manufacturing method of the PPS resin (a). The manufacturing method is, however, not limited to this method.

Preliminary Process

In the manufacturing method of the PPS resin (a), the sulfidizing agent is generally used in the form of a hydrate. It is preferable to raise the temperature of a mixture including the organic polar solvent and the sulfidizing agent and thereby remove an excess amount of water out of the system, prior to addition of the polyhalogenated aromatic compound.

As described above, the sulfidizing agent used may be the sulfidizing agent prepared in situ in the reaction system from the alkali metal hydrosulfide and the alkali metal hydroxide or may be the sulfidizing agent prepared in a separate tank from the polymerization tank. There is no specific limitation in this method, but the following method is preferable. A preferable method adds the alkali metal hydrosulfide and the alkali metal hydroxide to the organic polar solvent in an inert gas atmosphere in a temperature range from ordinary temperature to 150° C. or preferably from ordinary temperature to 100° C. and to raise the temperature of the mixture to at least not lower than 150° C. or preferably to 180 to 260° C. under ordinary pressure or under reduced pressure to distill away the water content. The ordinary temperature herein means 25° C. The ordinary pressure herein means 1 atm. The polymerization modifier may be added in the stage of distillation of the water content. Toluene or the like may be added in the reaction to accelerate distillation of the water content.

In the polymerization reaction, the amount of water in the polymerization system is preferably not less than 0.3 mol and not greater than 10.0 mol per 1 mol of the sulfidizing agent used. The amount of water in the polymerization system is an amount by subtracting the amount of water removed out of the polymerization system from the amount of water added to the polymerization system. The water added may be in any form, for example, general water, an aqueous solution or water of crystallization.

Polymerization Reaction Process

The PPS resin (a) is manufactured by reaction of the sulfidizing agent with the polyhalogenated aromatic compound in the organic polar solvent in a temperature range of not lower than 200° C. and lower than 290° C.

At the start of the polymerization reaction process, the organic polar solvent, the sulfidizing agent and the polyhalogenated aromatic compound are mixed preferably in an inert gas atmosphere. The temperature range at the start of the polymerization reaction process is preferably not lower than ordinary temperature and is more preferably not lower than 100° C. The temperature range on start of the polymerization reaction process is preferably not higher than 240° C. and more preferably not higher than 230° C. The polymerization modifier may be added in the stage of the polymerization reaction process. The sequence of addition of these raw materials may be an arbitrary order or may be simultaneous.

The temperature of this mixture is generally raised to 200° C. to 290° C. The temperature rise rate is not specifically limited but is generally a rate of 0.01° C./minute to 5° C./minute and more preferably a rate of 0.1° C./minute to 3° C./minute.

A general procedure raises the temperature of the mixture finally to the temperature of 250° C. to 290° C. and reacts the mixture at this temperature generally for 0.25 hours to 50 hours or preferably for 0.5 hours to 20 hours.

A method of reacting the mixture at the temperature of, for example, 200° C. to 260° C. for a certain time period prior to a temperature rise to the final temperature and subsequently raising the temperature of the mixture to the temperature of 270° C. to 290° C. is effective to provide the higher degree of polymerization. In this method, the reaction time at the temperature of 200° C. to 260° C. is generally selected to 0.25 hours to 20 hours and is preferably selected to 0.25 hours to 10 hours.

Polymerization in multiple stages may be effective to obtain a polymer having the higher degree of polymerization. In a polymerization in multiple stages, it is effective to raise the temperature of the mixture when the conversion rate of the polyhalogenated aromatic compound in the system at 245° C. reaches 40 mol % or higher or preferably 60 mol % or higher.

The conversion rate of the polyhalogenated aromatic compound (abbreviated as PHA) is a calculated value according to an expression given below. The remaining amount of PHA is generally determined by gas chromatography.

(A) In addition of an excess amount of the polyhalogenated aromatic compound at the molar ratio relative to the alkali metal sulfide:

conversion rate=[use amount of PHA (mol)−remaining amount of PHA (mol)]/[use amount of PHA (mol)−excess amount of PHA (mol)].

(B) In other than the above (A):

conversion rate=[use amount of PHA (mol)−remaining amount of PHA (mol)]/[use amount of PHA (mol)].

Recovery Process

The manufacturing method of the PPS resin (a) recovers a solid substance from the polymerization reactant including the polymer and the solvent after completion of polymerization. Any of known techniques may be employed as the method of recovery.

For example, a method employed may slowly cool down the polymerization reactant after completion of the polymerization reaction and recover polymer particles. The slow cooling rate in this method is not specifically limited, but is generally approximately 0.1° C./minute to 3° C./minute. The slow cooling rate is not necessarily a fixed rate in the entire slow cooling process. A method employed may set the slow cooling rate to 0.1 to 1° C./minute until crystallization and deposition of polymer particles and subsequently change the slow cooling rate to a rate of not lower than 1° C./minute.

Another preferable method performs the above recovery in a rapid cooling condition. A flushing technique is one preferable technique employed in this recovery method. The flushing technique is a method of flushing the polymerization reactant from the state of high temperature and high pressure (generally the state of 250° C. or higher and 8 kg/cm$^2$ or higher) into an atmosphere of ordinary pressure or reduced pressure to recover the polymer in a powdery form simultaneously with recovery of the solvent. The term "flushing" herein means ejecting the polymerization reactant from a nozzle. The atmosphere into which the polymerization reactant is flushed is, for example, nitrogen or water vapor under ordinary pressure. The temperature of the atmosphere into which the polymerization reactant is flushed is generally temperature 150° C. to 250° C.

Post Treatment Process

The PPS resin (a) may be subjected to acid treatment, hot water treatment, washing with an organic solvent or treatment with an alkali metal or an alkaline earth metal after being produced through the polymerization process and the recovery process described above.

The following describes conditions of acid treatment. The acid used for acid treatment of the PPS resin (a) is not specifically limited but may be any acid that does not act to decompose the PPS resin (a). Examples of the acid include acetic acid, hydrochloric acid, sulfuric acid, phosphoric acid, silicic acid, carbonic acid and propionic acid. Among these acids, acetic acid and hydrochloric acid are used more preferably. Any acid that decomposes and degrades the PPS resin (a) such as nitric acid is undesirable.

A method employed for acid treatment may, for example, soak the PPS resin (a) in an acid or an acid aqueous solution with appropriately stirring or heating as needed basis. For example, when using acetic acid, a method of soaking the PPS resin powder in an acetic acid aqueous solution of pH 4 heated to the temperature of 80° C. to 200° C. with stirring for 30 minutes provides the sufficient effect. After the treatment, pH may be 4 or higher, for example, approximately 4 to 8. It is preferable to wash the PPS resin (a) after the acid treatment with water or with warm water multiple times, for the purpose of removing the remaining acid, salt or the like. Water used for such washing is preferably distilled water or deionized water to not damage the effect of desired chemical modification of the PPS resin (a) by the acid treatment.

The following describes the conditions of hot water treatment. In the hot water treatment of the PPS resin (a), the temperature of hot water is preferably not lower than 100° C., more preferably not lower than 120° C., furthermore preferably not lower than 150° C., and especially preferably not lower than 170° C. The temperature of lower than 100° C. undesirably has little effect of desired chemical modification of the PPS resin (a).

Water used for the hot water treatment is preferably distilled water or deionized water to provide the effect of desired chemical modification of the PPS resin (a) by washing with hot water. An operation of the hot water treatment is not specifically limited. A method employed for hot water treatment may be, for example, a method of heating and stirring a predetermined amount of the PPS resin (a) placed in a predetermined amount of water in a pressure vessel or a method of continuously performing the hot water treatment. The larger amount of water than that of the PPS resin (a) is preferable as the ratio of the PPS resin (a) to water. The ratio of 200 g or less of the PPS resin (a) to 1 liter of water is generally selected.

The atmosphere in the treatment is preferably an inert atmosphere to avoid undesirable degradation of the terminal group. It is preferable to wash the PPS resin (a) after this hot water treatment with warm water multiple times, for the purpose of removing the remaining components.

The following describes conditions of washing with an organic solvent. The organic solvent used to wash the PPS resin (a) is not specifically limited, but may be any organic solvent that does not act to decompose the PPS resin (a). Examples of the organic solvent used to wash the PPS resin (a) include nitrogen-containing polar solvents such as N-metyl-2-pyrrolidone, dimethylformamide, dimethylacetamide, 1,3-dimethyl imidazolidinone, hexamethylphosphoramide, and piperazinones; sulfoxide and sulfone solvents such as dimethyl sulfoxide, dimethyl sulfone, and sulfolane; ketone solvents such as acetone, methyl ethyl ketone, diethyl ketone, and acetophenone; ether solvents such as dimethyl ether, dipropyl ether, dioxane and tetrahydrofuran; halogenated solvents such as chloroform, methylene chloride, trichloroethylene, ethylene dichloride, perchloroethylene, monochloroethane, dichloroethane, tetrachloroethane, perchloroethane and chlorobenzene; alcoholic and phenolic solvents such as methanol, ethanol, propanol, butanol, pentanol, ethylene glycol, propylene glycol, phenol, cresol, polyethylene glycol and polypropylene glycol; and aromatic hydrocarbon solvents such as benzene, toluene, and xylene. Among these organic solvents, especially preferably used are N-methyl-2-pyrrolidone, acetone, dimethylformamide and chloroform. One of these organic solvents or a mixture of two or more different types of these organic solvents may be used.

A method employed to wash with the organic solvent may, for example, soak the PPS resin (a) in the organic solvent with appropriately stirring or heating as needed basis. The temperature when the PPS resin (a) is washed with the organic solvent is not specifically limited but may be any temperature from ordinary temperature to approximately 300° C. An increase in washing temperature is likely to increase the washing efficiency. The washing temperature at ordinary temperature to 150° C., however, generally provides the sufficient effect. The PPS resin (a) may be washed in a pressure vessel under pressure at a temperature equal to or higher than the boiling temperature of the organic solvent. The washing time is not specifically limited. The washing time depends on the washing conditions, but washing for five minutes or longer generally provides the sufficient effect in batch-type washing. Continuous washing may also be employed.

A method employed for treatment with an alkali metal or an alkaline earth metal may be a method of adding an alkali metal salt or an alkaline earth metal salt before the preliminary process described above, during the preliminary process or after the preliminary process. A method employed for treatment with the alkali metal or the alkaline earth metal may be a method of adding an alkali metal salt or an alkaline earth metal salt to the polymerization tank before the polymerization process described above, during the polymerization process or after the polymerization process or may be a method of adding an alkali metal salt or an alkaline earth metal salt in the initial stage, in the middle stage or the final stage of the washing process described above. Among them, a simplest method is a method of removing the remaining oligomers and the remaining salts by washing with the organic solvent and washing with warm water or washing with hot water and subsequently adds an alkali metal salt or an alkaline earth metal salt. It is preferable to introduce the alkali metal or the alkaline earth metal into the PPS in the form of an alkali metal ion or an alkaline earth metal ion such as an acetate, a hydroxide or a carbonate. It is also preferable to remove an excess of the alkali metal salt or an excess of the alkaline earth metal salt by washing with warm water or the like. The concentration of the alkali metal ion or the alkaline earth metal ion for introduction of the alkali metal or the alkaline earth metal described above is preferably not lower than 0.001 mmol and is more preferably not lower than 0.01 mmol per 1 g of PPS. The temperature is preferably not lower than 50° C., more preferably not lower than 75° C. and especially preferably not lower than 90° C. There is no upper limit temperature, but the temperature of not higher than 280° C. is generally preferable from the viewpoint of operability. The ratio (of the weight of the washing liquid to the weight of the dried PPS) is preferably not lower than 0.5, more preferably not lower than 3 and furthermore preferably not lower than 5.

To obtain the polyphenylene sulfide resin composition having excellent melt stability, a preferable method repeats washing with the organic solvent and washing with warm water of approximately 80° C. or washing with hot water described above multiple times to remove the remaining oligomers and the remaining salts and subsequently performs the acid treatment or the treatment with the alkali metal salt or the alkaline earth metal salt. More preferable is the treatment with the alkali metal salt or the alkaline earth metal.

Additionally, the PPS resin (a) may have an increased molecular weight by thermal oxidation crosslinking treatment that includes heating in an oxygen atmosphere after completion of polymerization and heating with addition of a crosslinking agent such as a peroxide.

In dry heat treatment for the purpose of increasing the molecular weight by thermal oxidation crosslinking, the temperature is preferably not lower than 160° C. and more preferably not lower than 170° C. The temperature in dry heat treatment for the purpose of increasing the molecular weight by thermal oxidation crosslinking is preferably not higher than 260° C. and more preferably not higher than 250° C. The concentration of oxygen is preferably not lower than 5% by volume and more preferably not lower than 8% by volume. There is no specific upper limit in concentration of oxygen, but approximately 50% by volume is the limit. The treatment time is preferably not shorter than 0.5 hours and more preferably not shorter than 1 hour. The treatment time is furthermore preferably not shorter than 2 hours. The treatment time is preferably not longer than 100 hours and more preferably not longer than 50 hours. The treatment time is furthermore preferably not longer than 25 hours. A device used for the heat treatment may be a general hot air dryer, a rotary heating device or a heating device with a rotor blade. It is more preferable to use the rotary heating device or the heating device with the rotor blade for more uniform and efficient treatment.

Dry heat treatment with suppression of thermal oxidation crosslinking may be performed for the purpose of removing the volatile content. The temperature of the dry heat treatment is preferably not lower than 130° C. and more preferably not lower than 160° C. The temperature of the dry heat treatment is preferably not higher than 250° C. The concentration of oxygen is preferably lower than 5% by volume and more preferably lower than 2% by volume. The treatment time is preferably not shorter than 0.5 hour and more preferably not shorter than 1 hour. The treatment time is preferably not longer than 50 hours and more preferably not longer than 20 hours. The treatment time is furthermore preferably not longer than 10 hours. A device used for the heat treatment may be a general hot air dryer, a rotary heating device or a heating device with a rotor blade. It is more preferable to use the rotary heating device or the heating device with the rotor blade for more uniform and efficient treatment.

With a view to providing the excellent toughness, the PPS resin (a) is preferably a substantially linear PPS resin without increasing the molecular weight by thermal oxidation crosslinking treatment or a half-crosslinked PPS resin slightly treated by oxidation crosslinking treatment. The PPS resin treated by thermal oxidation crosslinking treatment is preferable with a view to suppressing the creep strain and may be used by appropriately mixing with the linear PPS resin. Multiple different PPS resins (a) having different melt viscosities may be used as a mixture.

Preferably, the PPS resin (a) includes a carboxyl group in a range of 25 µmol/g to 400 µmol/g with a view to enhancing the compatibility with a fluororesin (b). The content of the carboxyl group is preferably not lower than 25 µmol/g and more preferably not lower than 30 µmol/g. The content of the carboxyl group is preferably not higher than 400 µmol/g and more preferably not higher than 250 µmol/g. The content of the carboxyl group is preferably not higher than 150 µmol/g and furthermore preferably not higher than 80 µmol/g. The content of the carboxyl group in the PPS resin of lower than 25 µmol/g is undesirable since it is likely to reduce the interaction with the fluororesin. The content of the carboxyl group in the PPS resin of higher than 400 µmol/g is, on the other hand, undesirable since it increases the amount of volatile component in the manufacturing process.

A method of introducing the carboxyl group into the PPS resin (a) may be a method of copolymerizing a carboxyl group-containing polyhalogenated aromatic compound. Another method of introducing the carboxyl group into the PPS resin (a) may be a method of adding a carboxyl group-containing compound, for example, maleic anhydride or sorbic acid to be melt kneaded with and react with the PPS resin (a).

(2) Fluororesin (b)

The structure of the fluororesin is not specifically limited, but preferably comprised of at least one type of fluoroolefin. The fluororesin may be, for example, a homopolymer such as tetrafluoroethylene or chlorotrifluoroethylene; a copolymer with hexafluoropropylene, perfluoro(alkyl vinyl ether), vinylidene fluoride or vinyl fluoride; or a copolymer with a non-fluorine-containing ethylene monomer such as ethylene, propylene, butene or an alkyl vinyl ether. Concrete examples include polytetrafluoroethylene (PTFE), ethylene tetrafluoroethylene copolymer (ETFE), tetrafluoroethylene perfluoro(alkyl vinyl ether) copolymer (PFA), tetrafluoroethylene hexafluoropropylene copolymer (FEP), ethylene tetrafluoroethylene hexafluoropropylene terpolymer, polyvinylidene fluoride (PVDF) and polychlorotrifluoroethylene (PCTFE). Among these fluororesins, in terms of the easy melt molding process, preferable are ethylene tetrafluoroethylene copolymer (ETFE), tetrafluoroethylene perfluoro (alkyl vinyl ether) copolymer (PFA), tetrafluoroethylene hexafluoropropylene copolymer (FEP) and polyvinylidene fluoride (PVDF), and especially preferable is ethylene tetrafluoroethylene copolymer (ETFE).

Preferably, the fluororesin contains a reactive functional group with a view to forming an intermolecular bond with the PPS resin or an organosilane compound.

The reactive functional group contained in the fluororesin is not specifically limited, but concrete examples include vinyl group, epoxy group, carboxyl group, acid anhydride group, ester group, aldehyde group, carbonyl dioxy group, haloformyl group, alkoxy carbonyl group, amino group, hydroxyl group, styryl group, methacrylic group, acrylic group, ureido group, mercapto group, sulfide group, isocyanate group, and hydrolysable silyl group. Among these reactive functional groups, epoxy group, carboxyl group, acid anhydride group, amino group and hydroxyl group are preferable, and two or more different types of these reactive functional groups may be contained in the fluororesin.

A method employed to introduce the reactive functional group into the fluororesin may be a method of blending a compound or a resin compatible with the fluororesin and contains the functional group described above, a method of copolymerizing with a polymerizable monomer that contains the above functional group or that contains a functional group convertible to the above functional group in the process of polymerization of the fluororesin, a method of using an initiator that contains the above functional group or that contains a functional group convertible to the above functional group in the process of polymerization of the fluororesin, a method of causing the fluororesin to react with a polymerizable monomer that contains the above functional group or that contains a functional group convertible to the above functional group in the presence of a radial generator, or a method of modifying the fluororesin by a technique such as oxidation or pyrolysis. Among these methods, a method of introducing the functional group into a main chain or a side chain of the fluororesin by copolymerization and a method of causing the fluororesin to react with the polymerizable monomer containing the functional group in the presence of a radial generator are preferable in terms of the quality, the cost and the introduction amount control.

The functional group-containing polymerizable monomer is not specifically limited but may be, for example, acrylic acid, methacrylic acid, maleic acid, itaconic acid, citraconic acid, crotonic acid, nadic acid, acid anhydrides thereof, glycidyl acrylate, glycidyl methacrylate, glycidyl ethylacrylate, glycidyl itaconate, vinyl acetate, vinyl propionate, vinyltrimethoxysilane, vinyltriethoxyl silane and γ-methacryloxypropyltrimethoxysilane.

The amount of the functional group included in the fluororesin is preferably not lower than 0.01 mol %, more preferably not lower than 0.05 mol % and furthermore preferably not lower than 0.1 mol % relative to 1 mol of the fluororesin (b) in terms of the sufficient progress of the reaction with the PPS resin (a). The upper limit of the amount of the functional group is not specifically limited as long as the amount of the functional group does not damage the inherent characteristics of the fluororesin. In terms of possible reduction of the flowability, the amount of the functional group may preferably be not higher than 10 mol % and more preferably not higher than 3 mol %.

The amount of the fluororesin is not specifically limited. The amount of the fluororesin is preferably not less than 5 parts by weight or more preferably not less than 10 parts by weight relative to 100 parts by weight of the PPS resin. The amount of the fluororesin is preferably not greater than 250 parts by weight or more, preferably not greater than 200 parts by weight relative to 100 parts by weight of the PPS resin. The amount of the fluororesin is preferably not greater than 125 parts by weight or furthermore preferably not greater than 79 parts by weight relative to 100 parts by weight of the PPS resin. The amount of the fluororesin of greater than 250 parts by weight has difficulty in reducing the dispersion diameter of a primary dispersed phase formed by the fluororesin and is thus likely to damage the excellent toughness property of the PPS resin composition. The amount of the fluororesin of less than 5 parts by weight is, on the other hand, likely to reduce the effect of providing desired flexibility and toughness. Combined use of two or more different types of the fluororesins is effective to provide properties such as toughness, flexibility and electrical properties.

The fluororesin has a melting point of preferably not higher than 340° C., more preferably not higher than 310° C. or furthermore preferably not higher than 280° C. In terms of the heat resistance of the fluororesin at the processing temperature of the PPS resin, the lower limit of the melting point is preferably not lower than 150° C. and more preferably not lower than 190° C. The fluororesin having the melting point of higher than 340° C. requires the higher temperature for melt kneading. This causes deterioration of the PPS resin and is likely to deteriorate the mechanical properties and the like.

The fluororesin has an MFR (melt flow rate) of preferably not lower than 0.1 g/10 minutes. The fluororesin also has the MFR of preferably not higher than 300 g/10 minutes or more preferably not higher than 100 g/10 minutes. The above MFR range is preferable for formation of a desired phase-separated structure. The MFR of lower than the above MFR range provides the poor extrusion processability. The MFR of higher than the above MFR range provides the poor mechanical properties.

As one exemplary measurement method, in tetrafluoroethylene perfluoroalkyl vinyl ether copolymer, the MFR is defined as an amount (g/10 minutes) that passes through a nozzle of 2 mm in diameter and 10 mm in length for 10 minutes under a load of 5 kg at 372° C. according to ASTM-D3307 (2010). In tetrafluoroethylene hexafluoropropylene copolymer, the MFR is defined as a similar amount of passing under a load of 5 kg at 372° C. according to ASTM-D2116 (2007). In the case of ethylene tetrafluoroethylene copolymer, the MFR is defined as a similar amount of passing under a load of 5 kg at 297° C. according to ASTM-D3159 (2010).

(3) Organosilane Compound (c)

Adding an organosilane compound to the PPS resin composition is useful in enhancing the dispersibility of the fluororesin to the PPS resin and is effective in enhancing the toughness.

Concrete examples of the organosilane compound include epoxy group-containing alkoxysilane compounds such as γ-glycidoxypropyltrimethoxysilane, γ-glycidoxypropyltriethoxy-silane, and β-3,4-epoxycyclohexyl)ethyltrimethoxysilane; mercapto group-containing alkoxysilane compounds such as γ-mercaptopropyltrimethoxysilane and γ-mercaptopropyl-triethoxysilane; ureido group-containing alkoxysilane compounds such as γ-ureidopropyltrieth-oxysilane, γ-ureidopropyltrimethoxylsilane and γ-(2-ureidoethyl) aminopropyltrimethoxysilane; isocyanate group-containing alkoxysilane compounds such as γ-isocyanatepropyltriethoxysilane, γ-isocyanatepropyltrimethoxysilane, γ-isocyanatepropylmethyldimethoxysilane, γ-isocyanatepropylmethyldiethoxysilane, γ-isocyanatepropylethyldimethoxysilane, γ-isocyanatepropylethyldiethoxysilane and γ-isocyanatepropyltrichlorosilane; and amino group-containing alkoxysilane compounds such as γ-(2-aminoethyl)aminopropylmethyldimethoxysilane, γ-(2-aminoethyl)aminopropyltrimethoxysilane and γ-aminopropyltrimethoxysilane. Among these organosilane compounds, the isocyanate group-containing alkoxysilane compounds are especially preferable in terms of the reactivity.

The amount of the organosilane compound is preferably not less than 0.1 parts by weight and is specially preferably not less than 0.2 parts by weight relative to 100 parts by weight of the PPS resin. The amount of the organosilane compound is also preferably not greater than 5 parts by weight and is specially preferably not greater than 3 parts by weight relative to 100 parts by weight of the PPS resin.

(4) Inorganic Filler (d)

The PPS resin composition may be used by blending an inorganic filler (d) as a non-essential component in an amount that does not damage the advantageous effects. Concrete examples of the inorganic filler include fibrous fillers such as glass fibers, carbon fibers, carbon nanotubes, carbon nanohorns, potassium titanate whiskers, zinc oxide whiskers, calcium carbonate whiskers, wollastonite whiskers, aluminum borate whiskers, aramid fibers, alumina fibers, silicon carbide fibers, ceramic fibers, asbestos fibers, gypsum fibers and metal fibers; fullerene; silicates such as talc, wollastonite, zeolite, sericite, mica, kaolin, clay, pyrophyllite, silica, bentonite, asbestos and alumina silicate; silicon oxide; metal compounds such as magnesium oxide, alumina, zirconium oxide, titanium oxide and iron oxide; carbonates such as calcium carbonate, magnesium carbonate and dolomite; sulfates such as calcium sulfate and barium sulfate; hydroxides such as calcium hydroxide, magnesium hydroxide and aluminum hydroxide; and non-fibrous fillers such as glass beads, glass flakes, glass powders, ceramic beads, boron nitride, silicon carbide, carbon black, silica and graphite. Among these inorganic fillers, glass fibers, silica and calcium carbonate are preferable, and calcium carbonate and silica are especially preferable in terms of the effects of an anticorrosive and a lubricant. The inorganic filler (d) may have a hollow structure, and two or more different types of the inorganic fillers may be used in combination. The inorganic filler (d) may be preliminarily treated with a coupling agent such as an isocyanate-based compound, an organosilane-based compound, an organotitanate-based compound, an organoborane-based compound or an epoxy compound. Among the above inorganic fillers, calcium carbonate, silica and carbon black are preferable in terms of the effects of an anticorrosive and a lubricant and the effect of providing the electrical conductivity.

The amount of the inorganic filler is not greater than 40 parts by weight, preferably less than 10 parts by weight, more preferably less than 1 part by weight and furthermore preferably not greater than 0.8 parts by weight relative to a total of 100 parts by weight of the polyphenylene sulfide resin (a) and the fluororesin (b) described above. There is no specific lower limit, but the amount of the inorganic filler is preferably not less than 0.0001 parts by weight relative to the total of 100 parts by weight of the polyphenylene sulfide resin (a) and the fluororesin (b) described above. Blending the inorganic filler is advantageous in improving the elastic modulus of the material. Blending a large amount of the inorganic filler over 40 parts by weight is, however, undesirable since it significantly decreases the toughness. The content of the inorganic filler may be changed appropriately according to the application by taking into account the balance between the toughness and the rigidity.

(5) Other Additives (e)

Additionally, a resin other than the fluororesin may be added to and blended in the PPS resin composition in an amount that does not damage the advantageous effects. Concrete examples of the resin other than the fluororesin include polyamide resin, polybutylene terephthalate resin, polyethylene terephthalate resin, modified polyphenylene ether resin, polysulfone resin, polyarylsulfone resin, polyketone resin, polyarylate resin, liquid crystal polymer, polyether ketone resin, polythioether ketone resin, poly (ether ether ketone) resin, polyimide resin, polyamide imide resin, fluororesin without functional group and olefin copolymer without epoxy group such as ethylene/butene copolymer.

The content of the olefin copolymer without epoxy group such as the ethylene/butene copolymer is selected in the range of not greater than 10 parts by weight relative to a total of 100 parts by weight of the PPS resin (a) and the fluororesin (b), in terms of providing the good heat resistance. The content of the olefin copolymer without epoxy group is preferably not greater than 4 parts by weight and is more preferably not greater than 2 parts by weight relative to the total of 100 parts by weight of the PPS resin (a) and the fluororesin (b). Furthermore preferable is no content of the olefin copolymer without epoxy group.

No content of an olefin elastomer having a reactive functional group such as carboxylate group, acid anhydride group, epoxy group, amino group or vinyl group is preferable in terms of providing the good heat resistance.

The following compounds may further be added for the purpose of property modification: plasticizers such as polyalkylene oxide oligomer-based compounds, thioether-based compounds, ester-based compounds and organophosphorus-based compounds; crystal nucleating agents such as organophosphorus compounds and poly(ether ether ketone); metal soaps such as montanic acid waxes, lithium stearate and aluminum stearate; mold release agents such as ethylene diamine-stearic acid-sebacic acid polycondensates and silicone-based compounds; coloring inhibitors such as hypophosphites; and other conventional additives including water, lubricants, ultraviolet ray inhibitors, coloring agents and foaming agents. When the added amount of the above compounds exceeds 20% by weight of the entire composition, this undesirably damages the inherent characteristic of the PPS resin composition. The added amount of the above compounds is thus preferably not higher than 10% by weight and is more preferably not higher than 1% by weight.

(6) Manufacturing Method of Resin Composition

A typical procedure employable for melt kneading supplies at least the PPS resin (a), the fluororesin (b) and the organosilane compound (c) to a twin-screw extruder and kneads the supplied mixture at a processing temperature higher by 5° C. to 100° C. than the higher melting point of the resin between the melting points of the PPS resin (a) and the fluororesin (b). There is a need for melt kneading with elongational flow in addition to shear flow to decrease the dispersion diameter of a fluororesin dispersed phase to be not greater than 1 μm and to additionally form a secondary dispersed phase of a different component in a primary dispersed phase of the fluororesin.

A concrete example of melt kneading with shear flow uses a twin-screw extruder that preferably has two or more kneading portions or more preferably has three or more kneading portions. The upper limit number of the kneading portions depends on the balance between the length of one kneading portion and the interval of kneading portions and is preferably not greater than ten kneading portions and is more preferably not greater than eight kneading portions. The ratio "L/D" (where L represents the length of the screw and D represents the diameter of the screw) of the twin-screw extruder is preferably not lower than 10, is more preferably not lower than 20 and is furthermore preferably not lower than 30. The upper limit of the ratio L/D of the twin-screw extruder is generally 60, is preferably not higher than 50 and is more preferably not higher than 45. The peripheral velocity is selected preferably in a range of 15 m/minute to 50 m/minute or more preferably in a range of 20 m/minute to 40 m/minute. The ratio "L/D" of the twin-screw extruder of lower than 10 is likely to cause insufficient kneading. This provides a coarse dispersed phase of the fluororesin and causes difficulties in obtaining the PPS resin composition having the excellent heat resistance, chemical resistance, toughness and surface smoothness. The number of the kneading portions of less than two or the peripheral velocity of lower than 15 m/minute reduces the dispersibility of the fluororesin with a decrease in shear force and is thus likely to cause difficulties in obtaining desired physical properties. The peripheral velocity of higher than 50 m/minute, on the other hand, increases the load applied to the twin-screw extruder and is thus undesirable in terms of the productivity.

With a view to achieving a finer dispersion of the fluororesin, the ratio of the total length of the kneading portions to the overall length of the screw of the extruder is preferably not lower than 10%, more preferably not lower than 15% and furthermore preferably not lower than 20%. The ratio of the total length of the kneading portions to the overall length of the screw of the extruder is preferably not higher than 60%, more preferably not higher than 55% and furthermore preferably not higher than 50%. The ratio of the total length of the kneading portions to the overall length of lower than 10% causes insufficient kneading and reduces the dispersibility of the fluororesin. As a result, this causes difficulties in obtaining the PPS resin composition having the excellent heat resistance, chemical resistance, toughness and surface smoothness. The ratio of the total length of the kneading portions to the overall length of higher than 60%, on the other hand, generates heat due to excessive shear and increases the resin temperature. This is likely to cause decomposition of the resin to be kneaded.

When "Lk" denotes the length of one kneading portion in the screw of the extruder and "D" denotes the diameter of the screw, the ratio "Lk/D" preferably has the following range in terms of the kneadability. The ratio "Lk/D" is preferably not lower than 0.1, more preferably not lower than 1 and furthermore preferably not lower than 2. The ratio "Lk/D" is also preferably not higher than 10, more preferably not higher than 8 and furthermore preferably not higher than 6.

When "Ld" denotes the interval between kneading portions in the screw of the extruder and "D" denotes the diameter of the screw, the ratio "Ld/D" preferably has the following range with a view to suppressing excessive heat generation of the molten resin due to shear of continuous kneading portions. The ratio "Ld/D" is preferably not lower than 0.5, more preferably not lower than 1 and furthermore preferably not lower than 2. The ratio "Ld/D" is also preferably not higher than 10, more preferably not higher than 8 and furthermore preferably not higher than 6.

The resin temperature during blending is preferably higher by 5° C. to 100° C. than the higher melting point of the resin between the melting points of the PPS resin (a) and the fluororesin (b) as described above. The resin temperature during blending is more preferably higher by 10° C. to 70° C. than the higher melting point of the resin between the melting points of the PPS resin (a) and the fluororesin (b). More specifically, the resin temperature is preferably not higher than 350° C. and more preferably not higher than 340° C. When the kneading temperature is lower than a temperature that is higher by 5° C. than the higher melting point of the resin between the melting points of the PPS resin (a) and the fluororesin (b), the presence of the partly unmelted PPS resin (a) or fluororesin (b) significantly increases the viscosity of the composition. This results in increasing the load applied to the twin-screw extruder and is thus undesirable in terms of the productivity. This is also likely to provide a coarse dispersed phase of the fluororesin with regard to the resin phase-separated structure of the obtained composition. When the kneading temperature is higher than a temperature that is higher by 100° C. than the higher melting point of the resin between the melting points of the PPS resin (a) and the fluororesin (b), on the other hand, this undesirably causes decomposition of the resin or the additive to be kneaded.

As described above, melt kneading in a shear flow field tends to reduce the dispersion diameter of the fluororesin. With a view to controlling a desired phase-separated structure including a primary dispersed phase of the fluororesin of not greater than 1 μm and a secondary dispersed phase of the PPS resin as the primary component formed in the primary dispersed phase, it is preferable to employ melt kneading in an elongational flow field along with melt kneading in a shear flow field.

Compared to the shear flow generally used in melt kneading, the elongational flow has the higher dispersion efficiency and accordingly allows for formation of a more finely dispersed phase-separated structure in a produced alloy.

In manufacturing the PPS resin composition by melt kneading with elongational flow, a difference between a pressure difference before an elongational flow zone for melt kneading with elongational flow and a pressure difference inside of the elongational flow zone is preferably 10 kg/cm² to 1000 kg/cm². A flow effect pressure drop that is the difference between the pressure difference before the elongational flow zone and the pressure difference inside of the elongational flow zone may be determined by subtracting the pressure difference inside of the elongational flow zone (ΔP0) from the pressure difference before the elongational flow zone (ΔP). When the flow effect pressure drop between before the elongational flow zone and inside of the elongational flow zone is lower than 10 kg/cm², this undesirably provides a low rate of formation of elongational flow in the elongational flow zone and causes unevenness of the pressure distribution. When the flow effect pressure drop between before the elongational flow zone and inside of the elongational flow zone is higher than 1000 kg/cm$^2$, on the other hand, this undesirably provides an excessively high back pressure in the extruder and causes difficulties in stable manufacture. The flow effect pressure drop between before the elongational flow zone and inside of the elongational flow zone is preferably not lower than 50 kg/cm$^2$ and is most preferably not lower than 100 kg/cm$^2$. The flow effect pressure drop between before the elongational flow zone and inside of the elongational flow zone is preferably not higher than 600 kg/cm$^2$ and is most preferably not higher than 500 kg/cm$^2$.

In manufacturing the PPS resin composition by melt kneading with elongational flow using the extruder, to obtain a desired phase-separated structure, the ratio of the total length of elongational flow zones for melt kneading with elongational flow to the overall length "L" of the screw of the extruder is preferably not lower than 3%, more preferably not lower than 4% and furthermore preferably not lower than 5%. The ratio of the total length of the elongational flow zones to the overall length "L" of the screw of the extruder is also preferably not higher than 20%, more preferably not higher than 17% and furthermore preferably not higher than 15%. When the ratio of the total length of the elongational flow zones is lower than 3% of the overall length of the screw of the extruder, this fails to provide a sufficient dispersion efficiency and is thus undesirable in formation of the phase-separated structure. When the ratio of the total length of the elongational flow zones is higher than 20% of the overall length of the screw of the extruder, on the other hand, this causes excessive heat generation to increase the resin temperature and is likely to cause decomposition of the resin to be kneaded.

In manufacturing the PPS resin composition by melt kneading with elongational flow using the extruder, when "Lm" denotes the length of one elongational flow zone for melt kneading with elongational flow in the screw of the extruder and "D" denotes the diameter of the screw, the ratio "Lm/D" is preferably not lower than 0.2, more preferably not lower than 0.3 and furthermore preferably not lower than 0.5 in terms of the kneadability and the reactivity. The ratio "Lm/D" is also preferably not higher than 10, more preferably not higher than 9 and furthermore preferably not higher than 8. It is preferable that the elongational flow zones for melt kneading with elongational flow in the twin-screw extruder are not localized in a specific location in the screw but are arranged over the entire area.

In manufacturing the PPS resin composition by melt kneading with elongational flow using the extruder, the following describes preferable concrete configurations of the elongational flow zone for melt kneading with elongational flow. The elongational flow zone may be formed by a kneading disk that is a twist kneading disk configured such that a helix angle θ, which is an angle between a top of a disk leading end side of the kneading disk and a top of its rear face side is 0°<θ<90° in a counter rotation direction of the screw, may be formed by a flight screw configured such that a resin passage of a sectional area reduced from a screw leading end toward a rear end is formed in a flight portion of the flight screw, or may be formed by a resin passage of a gradually reduced sectional area in which the molten resin passes through in the extruder.

To provide a finer primary dispersed phase of the fluororesin and form the secondary dispersed phase, it is preferable not to use a notch-type agitation screw. It is also undesirable to combine the notch-type agitation screw with the elongational flow zone for melt kneading with elongational flow.

The peripheral velocity is preferably 15 m/minute to 50 m/minute and more preferably 20 m/minute to 40 m/minute.

In manufacturing the PPS resin composition by melt kneading with elongational flow using the extruder, the retention time in the extruder is preferably not shorter than 1 minute, more preferably not shorter than 1.5 minutes, and furthermore preferably not shorter than 2 minutes. The retention time in the extruder is also preferably not longer than 30 minutes, more preferably not longer than 28 minutes and furthermore preferably not longer than 25 minutes. The retention time herein denotes an average of retention time from supply of raw materials to the extruder to discharge. The retention time is also defined as a time period from the time when generally about 1 g of a coloring agent is added along with raw materials from a screw base position determined as the position for supply of raw materials in the ordinary melt kneading state regulated to extrude a predetermined amount of an uncolored reaction control composition, to the time when the composition extruded from a discharge port of the extruder has a highest coloring degree by the coloring agent. The retention time of shorter than 1 minute undesirably provides the short reaction time in the extruder and thereby fails to sufficiently accelerate the reaction. The retention time of longer than 30 minutes, on the other hand, undesirably causes thermal degradation of the resin due to the long retention time.

The sequence of mixing the raw materials in the process of melt kneading is not specifically limited. Any method may be employed with regard to the sequence of mixing the raw materials in the process of melt kneading: for example, a method that melt kneads the mixture of all the raw materials by the above procedure; a method that melt kneads the mixture of part of the raw materials by the above procedure and subsequently melt kneads this mixture further mixed with the remaining raw materials; or a method that further mixes the remaining raw materials using a side feeder in the course of melt kneading the mixture of part of the raw materials by a twin-screw extruder. Among these methods, for the efficient progress of the reaction of the PPS resin (a) with the fluororesin (b) and the organosilane compound (c), a preferable method satisfies the screw configuration described above and melt kneads the mixture of all the raw materials.

A small amount of an additive component may be added to the other components that are kneaded by the above method or the like and pelletized, prior to molding.

(7) PPS Resin Composition

The PPS resin composition has excellent toughness, mechanical properties and surface smoothness in addition to excellent heat resistance, chemical resistance and the like which the PPS resin inherently has. To provide such characteristics, with regard to the resin phase-separated structure of the PPS resin composition observed by an electron microscope, there are requirements that the PPS resin (a) forms a continuous phase (sea phase or matrix), that the fluororesin (b) forms a primary dispersed phase (island phase, domain) having the number-average dispersion diameter of not larger than 1 μm, and that a secondary dispersed phase of the PPS resin (a) is included in the primary dispersed phase formed by the component (b) in the composition.

Formation of the resin phase-separated structure described above provides excellent toughness, mechanical properties and surface smoothness without damaging excellent heat resistance, chemical resistance and the like which the PPS resin inherently has. We found for the first time that our melt kneading method provides the phase-separated structure that forms the fine dispersion of the fluororesin having the number-average dispersion diameter of not larger than 1 μm and includes the secondary dispersed phase.

Furthermore, in the phase-separated structure of the PPS resin composition, the number-average dispersion diameter of the primary dispersed phase is necessarily not larger than 1 μm, preferably not larger than 0.8 μm, more preferably not larger than 0.7 μm and most preferably not larger than 0.6 μm.

The number-average dispersion diameter in the above range means the good compatibility of the PPS resin with the fluororesin and leads to the good toughness.

The "number-average dispersion diameter of the primary dispersed phase" is calculated by a procedure described below. A bending test piece (125 mm (in length)×12 mm (in width)×3 mm (in thickness)) of the PPS resin composition is molded at a molding temperature in a higher temperature range by 20° C. to 40° C. than the higher melting point of the resin between the melting points of the PPS resin (a) and the fluororesin (b). A thin slice of not greater than 0.1 μm is cut out from a center portion of the bending test piece in a sectional area direction of a dumbbell piece, and an image of the thin slice taken at approximately 1000- to 5000-fold magnification by a transmission electron microscope. A maximum diameter and a minimum diameter of each of any 100 primary dispersed phases are measured, and their average values are calculated. A number-average value obtained from these values is specified as the "number-average dispersion diameter of the primary dispersed phase."

The presence or the absence of the secondary dispersed phase is determined, based on determination of whether any secondary dispersed phase of the PPS resin as the main component is present in the primary dispersed phase observed by the transmission electron microscope according to the method described above. To control the dispersion state of the fluororesin in the PPS resin composition as described above, it is preferable to satisfy the condition that at least the PPS resin (a), the fluororesin (b) and the organosilane compound (c) are melt-kneaded in the twin-screw extruder having the elongational flow zones.

The tensile elongation (measured in conformity with ASTM-D638 (2010) using an ASTM No. 1 dumbbell test piece at the tension rate of 10 mm/min at 23° C.) that is one of the physical properties indicating the material strength is preferably not lower than 10%, is more preferably not lower than 15% and is furthermore preferably not lower than 20%.

The bending elastic modulus of the PPS resin composition is preferably not higher than 3.5 GPa and more preferably not higher than 3.2 GPa.

The bending elastic modulus herein denotes a measured value of bending elastic modulus when a bending test piece of 125 mm (in length)×12 mm (in width)×3 mm (in thickness) is formed from the PPS resin composition using an injection molding machine and subjected to a bending test under the conditions of the strain rate of 1.5 mm/min, 23° C. and the inter-span distance of 50 mm.

With regard to the weld characteristics of the PPS resin composition, the weld elongation is preferably not lower than 2%, more preferably not lower than 5% and furthermore preferably not lower than 8%.

The weld elongation herein denotes a measured value of rupture elongation when an ASTM No. 1 dumbbell test piece having gates at respective ends and a weld line in the vicinity of a center portion of the test piece is formed from the PPS resin composition and subjected to a tensile test under the conditions of the tension rate of 10 mm/min and the span of 114 mm.

The tensile elongation after heat treatment that is an indication of the heat resistance of the PPS resin composition preferably has the following range. The tensile elongation after heat treatment in the air at 200° C. for 500 hours is preferably not lower than 10%, more preferably not lower than 13% and furthermore preferably not lower than 15% (measured in conformity with ASTM-D638 (2010) using an ASTM No. 1 dumbbell test piece at the tension rate of 10 mm/min at 23° C.).

There is no specific lower limit of the tensile rupture elongation after heat treatment. The tensile rupture elongation after heat treatment in the above range means that the PPS resin composition has good heat resistance. The tensile rupture elongation of the PPS resin composition before and after heat treatment is significantly affected by the dispersion state of the fluororesin. The coarse dispersion of the fluororesin in the phase-separated structure without formation of the desired phase-separated structure leads to a decrease in tensile elongation.

The PPS resin composition has the high tensile rupture elongation after heat treatment. This is expected to indicate the high heat resistance in continuous use under a high temperature environment.

The tensile elongation after ATF (automatic transmission fluid) soaking treatment that is an indication of the chemical resistance of the PPS resin composition preferably has the following range. The tensile elongation of the PPS resin composition after ATF soaking treatment at 165° C. for 500 hours is preferably not lower than 10%, more preferably not lower than 15% and furthermore preferably not lower than 19%.

There is no specific lower limit of the tensile rupture elongation after ATF soaking treatment. The tensile rupture elongation after ATF soaking treatment in the above range means that the PPS resin composition has good chemical resistance. The tensile rupture elongation of the PPS resin composition before and after ATF soaking treatment is significantly affected by the dispersion state of the fluororesin. The coarse dispersion of the fluororesin in the phase-separated structure without formation of the desired phase-separated structure leads to a decrease in tensile elongation.

The PPS resin composition has the high tensile rupture elongation after ATF soaking treatment. This is expected to indicate the high chemical resistance in continuous use under the environment exposed to ATF, oil, a coolant or the like.

With regard to the PPS resin composition, the center line average roughness (Ra) that is an indication of the surface smoothness is preferably not higher than 1.00 μm, more preferably not higher than 0.50 μm, furthermore preferably not higher than 0.30 μm and especially preferably not higher than 0.20 μm.

The surface smoothness of the bending test piece described above is measured by a surface roughness measuring device manufactured by Mitsutoyo Corporation. A measurement terminal of the measuring device is scanned by 2 cm in a resin flow direction (from a gate portion to a filling terminal end) on the bending test piece. The center line average roughness Ra specified in JIS B0601 is measured, and an average value of n=3 is calculated. The smaller average value of the center line average roughness Ra indicates the better surface smoothness.

(8) Applications

The polyphenylene sulfide resin composition may be molded by various molding techniques such as injection molding, extrusion molding, compression molding, blow molding and injection compression molding. The polyphenylene sulfide resin composition is especially useful as the resin composition for injection molding or for extrusion molding. The polyphenylene sulfide resin composition has flexibility, toughness and surface smoothness in addition to excellent chemical resistance and heat resistance. Accordingly, the polyphenylene sulfide resin composition is preferably used for electric and electronic components, components of communication equipment, automobile components, components of home electric appliances and components of OA equipment.

The polyphenylene sulfide resin composition has electrical insulation properties in a wide temperature range to high temperature and is thus preferably used in the application of electrical insulation members.

Molded products obtained by extrusion molding include, for example, round bars, square bars, sheets, films, tubes and pipes. Concrete applications of the molded products obtained by extrusion molding include electrical insulation materials for water heater motors, air conditioner motors and driving motors, film capacitors, speaker diaphragms, magnetic tapes for recording, printed circuit board materials, printed circuit board peripheral components, semiconductor packages, semiconductor conveyance trays, process and mold release films, protective films, film sensors for automobiles, insulating tapes for wire cables, insulating washers in lithium ion batteries, tubes for hot water, cooling water and chemical agents, fuel tubes for automobiles, hot water pipe arrangements, chemical agent pipe arrangements in chemical plants and the like, pipe arrangements for ultrapure water and ultrapure solvents, automobile pipe arrangements, pipes in pipe arrangements for fluorocarbons and supercritical carbon dioxide solvents, and work piece holding rings for polishing equipment. Other applications include coated molded products of windings for motor coils of hybrid vehicles, electric vehicles, railways and power generation equipment, heat-resistant electric wire cables for home electrical appliances, wire harnesses and control wires for flat cables and the like used in automobile interior wirings, coated molded products of windings for signal transformers or vehicle-mounted transformers for communication, transmission, radio frequency radiation, audio equipment and measurement, and spiral tubes.

Applications of molded products obtained by injection molding include, for example, electric equipment components such as generators, motors, transformers, current transformers, voltage regulators, rectifiers, inverters, relays, power contacts, switches, circuit breakers, knife switches, multipole rods, electric component cabinets; electronic components such as sensors, LED lamps, connectors, sockets, resistors, relay cases, small switches, coil bobbins, capacitors, variable capacitor cases, optical pickups, oscillators, various terminal strips and boards, transformers, plugs, printed circuit boards, tuners, speakers, microphones, headphones, small motors, magnetic head bases, power modules, semiconductors, liquid crystal, FDD carriages, FDD chassis, motor brush holders, parabola antennas, and computer components; domestic and office electric appliance components such as VTR components, TV set components, irons, hair dryers, rice cooker components, microwave oven components, acoustic components, audio equipment components for audio devices, laser disks (registered trademark), and compact disks, lighting components, refrigerator components, air conditioner components, typewriter components and word processor components; machine-related components such as office computer-related components, telephone instrument-related components, facsimile-related components, copying machine-related components, washing jigs, motor components, lighters, and typewriters; and optical instrument and precision machine-related components such as microscopes, binoculars, cameras and watches; and automobile and vehicle-related components such as alternator terminals, alternator connectors, IC regulators, potentiometer bases for light dimmers, various valves including exhaust gas valves, various pipes and ducts for the fuel system, the exhaust system, and the air intake system, turbo ducts, air intake nozzle snorkels, intake manifolds, fuel pumps, engine cooling water joints, carburetor main bodies, carburetor spacers, exhaust gas sensors, cooling water sensors, oil temperature sensors, brake pad wear sensors, throttle position sensors, crankshaft position sensors, air flowmeters, brake pad wear sensors, thermostat bases for air conditioners, warm air heater flow control valves, brush holders for radiator motors, water pump impellers, turbine vanes, wiper motor-related components, distributors, starter switches, starter relays, transmission wire harnesses, windshield washer fluid nozzles, air conditioner panel switch plates, fuel-related solenoid valve coils, fuse connectors, horn terminals, electric component insulators, step motor rotors, lamp sockets, lamp reflectors, lamp housings, brake pistons, solenoid bobbins, engine oil filters, ignition device cases, and millimeter wave radars. Other examples of applications include gaskets for primary batteries and secondary batteries of cell phones, laptop computers, video cameras, hybrid vehicles and electric vehicles, gears, washers, screws, nuts, cable ties, piping joints, nozzles, bearings, retainers, and seal rings.

Molded products obtained by other molding include, for example, linings, coatings, bottles and tanks.

Among molded products obtained by other molding, especially useful are coated molded products of windings for motor coils of hybrid vehicles, electric vehicles, railways and power generation equipment, air conditioner components of expansion valves, shut-off valves, check valves and coolant regulator valves of service ports and the like, various pipes and ducts for the fuel-related system, the exhaust system and the air intake system of automobiles exposed to high temperature environments and especially turbo ducts.

EXAMPLES

The following more specifically describes our compositions and methods with reference to Examples. This disclosure is, however, not limited to the Examples described below.

Examples and Comparative Examples used the following as the PPS resin (a), the fluororesin (b) and the organosilane compound (c).

PPS Resin (a) (a-1 to a-3)
a-1: linear PPS resin: weight-average molecular weight of 50000, amount of carboxyl group of 42 µmol/g;
a-2: linear PPS resin: weight-average molecular weight of 70000, amount of carboxyl group of 33 µmol/g; and
a-3: linear PPS resin: weight-average molecular weight of 130000, amount of carboxyl group of 26 µmol/g.

Fluororesin (b) (b-1 to b-4)
b-1: ethylene tetrafluoroethylene copolymer (NEOFLON ETFE, EP-610 manufactured by Daikin Industries, Ltd., melting point of 225° C., MFR of 30 g/10 minutes (at 297° C., under 5 kg load));

b-2: tetrafluoroethylene hexafluoropropylene copolymer (NEOFLON FEP, NP-20 manufactured by Daikin Industries, Ltd., melting point of 270° C., MFR of 6.5 g/10 minutes (at 372° C., under 5 kg load));

b-3: reactive functional group-containing ethylene tetrafluoroethylene copolymer (ETFE, AH-2000 manufactured by Asahi Glass Co., Ltd., melting point of 240° C., MFR of 22 g/10 minutes (at 297° C., under 5 kg load)), amount of reactive functional group of 0.4 mol %; and b-4: reactive functional group-containing ethylene tetrafluoroethylene copolymer (ETFE, RP-5000 manufactured by Daikin Industries, Ltd., melting point of 195° C., MFR of 25 g/10 minutes (at 265° C., under 5 kg load)), amount of reactive functional group of 0.4 mol %.

Organosilane Compound (c) (c-1 to c-2)

c-1: γ-isocyanatepropyltriethoxysilane (KBE-9007 manufactured by Shin-Etsu Chemical Co., Ltd.); and c-2: 3-aminopropyltriethoxysilane (KBE-903 manufactured by Shin-Etsu Chemical Co., Ltd.)

The material properties were evaluated by methods described below in the following Examples.

Number-Average Dispersion Diameter of Primary Dispersed Phase

A bending test piece of 125 mm (in length)×12 mm (in width)×3 mm (in thickness) was molded under the conditions of the resin temperature that was a temperature higher by 30° C. than the higher melting point of the resin between the melting points of the PPS resin (a) and the fluororesin (b) and the mold temperature of 150° C. using an injection molding apparatus (SE 75-DUZ-C250) manufactured by Sumitomo Heavy Industries, Ltd. A thin slice of not greater than 0.1 µm was cut out in a −80° C. atmosphere from a center portion of the obtained bending test piece in a sectional area direction of the test piece. The thin slice was photographed at approximately 1000- to 10000-fold magnification by a transmission electron microscope H-7100 manufactured by Hitachi, Ltd. (resolution (particle image) of 0.38 nm and magnification of 500 to 600 thousand-fold). With regard to a dispersed portion of the fluororesin (b) dispersed in the PPS resin (a), a maximum diameter and a minimum diameter of each of any 100 primary dispersed phases were measured from the photograph, and their average values were calculated. A number-average value obtained from these values was specified as the number-average dispersion diameter of the primary dispersed phase.

Presence or Absence of Secondary Dispersed Phase

It was determined whether any secondary dispersed phase of the PPS resin as the primary component was present in the primary dispersed phase observed by the transmission electron microscope by the same method as that described above.

Tensile Test

An ASTM No. 1 dumbbell test piece was molded under the conditions of the resin temperature that was a temperature higher by 30° C. than the higher melting point of the resin between the melting points of the PPS resin (a) and the fluororesin (b) and the mold temperature of 150° C. using the injection molding apparatus (SE 75-DUZ-C250) manufactured by Sumitomo Heavy Industries, Ltd. The tensile strength and the tensile rupture elongation of the obtained test piece were measured under the conditions of the span of 114 mm, the tension rate of 10 mm/min, the temperature of 23° C. and the relative humidity of 50% in conformity with ASTM D638 (2010).

Tensile Rupture Elongation After Treatment at 200° C. for 500 Hours

A dumbbell test piece obtained by the same method as that described above was treated in a 200° C. atmosphere for 500 hours and subsequently subjected to a tensile test under the conditions of the span of 114 mm, the tension rate of 10 mm/min, the temperature of 23° C. and the relative humidity of 50% in conformity with ASTM D638 (2010). The elongation at the rupture of the test piece was measured.

Tensile Rupture Elongation After Chemical Soaking Treatment

A dumbbell test piece obtained by the same method as that described above was soaked in ATF oil and treated in a 165° C. atmosphere for 500 hours and subsequently subjected to a tensile test under the conditions of the span of 114 mm, the tension rate of 10 mm/min, the temperature of 23° C. and the relative humidity of 50% in conformity with ASTM D638 (2010). The elongation at the rupture of the test piece was measured.

Bending Test

A bending test piece of 125 mm (in length)×12 mm (in width)×3 mm (in thickness) was molded under the conditions of the resin temperature that a temperature higher by 30° C. than the higher melting point of the resin between the melting points of the PPS resin (a) and the fluororesin (b) and the mold temperature of 150° C. using the injection molding apparatus (SE 75-DUZ-C250) manufactured by Sumitomo Heavy Industries, Ltd. The obtained test piece was subjected to a bending test under the conditions of the strain rate of 1.5 mm/min, 23° C. and the inter-span distance of 50 mm. The bending elastic modulus and the bending strength were measured.

Welding Test

An ASTM No. 1 dumbbell test piece having gates at respective ends and a weld line in the vicinity of a center portion of the test piece was molded under the conditions of the resin temperature that was a temperature higher by 30° C. than the higher melting point of the resin between the melting points of the PPS resin (a) and the fluororesin (b) and the mold temperature of 150° C. using the injection molding apparatus (SE 75-DUZ-C250) manufactured by Sumitomo Heavy Industries, Ltd. The tensile strength and the tensile rupture elongation of the obtained test piece were measured under the conditions of the span of 114 mm, the tension rate of 10 mm/min, the temperature of 23° C. and the relative humidity of 50%.

Weight-Average Molecular Weight of PPS Resin

The weight-average molecular weight (Mw) of the PPS resin was calculated in polystyrene conversion by gel permeation chromatography (GPC). The following provides measurement conditions of GPC:

Apparatus: SSC-7110 (Senshu Scientific Co., Ltd.)
Column: Shodex UT806M×2
Eluent: 1-chloronaphthalene
Detector: differential refractive index detector
Column temperature: 210° C.
Pre-thermostatic bath temperature: 250° C.
Pump thermostatic bath temperature: 50° C.
Detector temperature: 210° C.
Flow rate: 1.0 mL/min
Sample injection volume: 300 µL (in slurry form: about 0.2% by weight).

Amount of Carboxyl Group in PPS Resin

The amount of carboxyl group in the PPS resin was calculated by Fourier transform infrared spectroscopy (hereinafter abbreviated as FT-IR).

Benzoic acid as a standard substance was measured by FT-IR. An absorption intensity (b1) of a peak at 3066 cm$^{-1}$ as absorption of the C—H bonding of the benzene ring and an absorption intensity (c1) of a peak at 1704 cm$^{-1}$ as absorption of the carboxyl group were read, and an amount of carboxyl group (U1) relative to one unit of the benzene ring was determined. The amount of carboxyl group (U1) was calculated by an equation of (U1)=(c1)/[(b1)/5]. An amorphous film obtained by melt-pressing the PPS resin at 320° C. for 1 minute and subsequently quenching the melt-pressed PPS resin was subjected to FT-IR measurement. An absorption intensity (b2) at 3066 cm$^{-1}$ and an absorption intensity (c2) at 1704 cm$^{-1}$ were read, and an amount of carboxyl group (U2) relative to one unit of the benzene ring was determined. The amount of carboxyl group (U2) was calculated by an equation of (U2)=(c2)/[(b2)/4]. The content of carboxyl group in 1 g of the PPS resin was calculated by the following equation:

amount of carboxyl group (μmol/g) in PPS resin= (U2)/(U1)/108.161×1000000.

Surface Smoothness Test

A bending test piece of 125 mm (in length)×12 mm (in width)×3 mm (in thickness) was molded under the conditions of the resin temperature that was a temperature higher by 30° C. than the higher melting point of the resin between the melting points of the PPS resin (a) and the fluororesin (b) and the mold temperature of 150° C. using the injection molding apparatus (SE 75-DUZ-C250) manufactured by Sumitomo Heavy Industries, Ltd. With regard to the obtained test piece, a center line average roughness Ra specified in JIS B0601 was measured using a surface roughness measuring device manufactured by Mitsutoyo Corporation by scanning a measurement terminal by 2 cm in a resin flow direction (from a gate portion to a filling terminal end), and an average value of n=3 was calculated.

Examples 1 to 7, Examples 12 to 15, Comparative Example 5

The PPS resin, the fluororesin and the organosilane compound shown in Tables 1 to 4 were dry-blended at the ratios shown in Tables 1 to 4 and melt-kneaded using a twin-screw extruder equipped with a vacuum vent TEX30α (L/D=45) manufactured by the Japan Steel Works, LTD. The twin-screw extruder had a screw arrangement having two elongational flow zones, a ratio of the elongational flow zones to the overall screw length of 10%, three kneading portions, a ratio of the kneading portions to the overall screw length of 45%, and the cylinder temperature set to 320° C. This kneading method is called method A. Each melt-kneaded mixture was then pelletized by a strand cutter. The obtained pellets were dried at 130° C. overnight and then injection molded. The respective resulting molded products were evaluated by the morphology observation, the tensile test, the heat resistance test, the chemical resistance test, the bending test, the welding test and the surface smoothness test.

Example 8

The PPS resin, the fluororesin and the organosilane compound shown in Table 2 were dry-blended at the ratio shown in Table 2 and melt-kneaded using a twin-screw extruder equipped with a vacuum vent (40 mmφ), L/D=60). The twin-screw extruder had a screw arrangement having two elongational flow zones, a ratio of the elongational flow zones to the overall screw length of 10%, three kneading portions, a ratio of the kneading portions to the overall screw length of 45%, and the cylinder temperature set to 320° C. This kneading method is called method D. The melt-kneaded mixture was then pelletized by a strand cutter. The obtained pellets were dried at 130° C. overnight and then injection molded. A resulting molded product was evaluated by the morphology observation, the tensile test, the heat resistance test, the chemical resistance test, the bending test, the welding test and the surface smoothness test.

Example 9

The fluororesin and the organosilane compound shown in Table 2 were dry-blended at the ratio shown in Table 2 and melt-kneaded using the twin-screw extruder equipped with the vacuum vent TEX30α (L/D=45) manufactured by the Japan Steel Works, LTD. The twin-screw extruder had a screw arrangement having two elongational flow zones, a ratio of the elongational flow zones to the overall screw length of 10%, three kneading portions, a ratio of the kneading portions to the overall screw length of 45%, and the cylinder temperature set to 320° C. The melt-kneaded mixture was then pelletized by a strand cutter. The obtained pellets were dried at 130° C. overnight. The obtained pellets and the PPS resin shown in Table 2 were then dry-blended at the ratio shown in Table 2 and melt-kneaded using the twin-screw extruder equipped with the vacuum vent TEX30α (L/D=45) manufactured by the Japan Steel Works, LTD. The twin-screw extruder had a screw arrangement having two elongational flow zones, a ratio of the elongational flow zones to the overall screw length of 10%, three kneading portions, a ratio of the kneading portions to the overall screw length of 45%, and the cylinder temperature set to 320° C. This kneading method is called method E. The melt-kneaded mixture was then pelletized by a strand cutter. The obtained pellets were dried at 130° C. overnight and then injection molded. A resulting molded product was evaluated by the morphology observation, the tensile test, the heat resistance test, the chemical resistance test, the bending test, the welding test and the surface smoothness test.

Example 10

The PPS resin, the fluororesin and the organosilane compound shown in Table 2 were dry-blended at the ratio shown in Table 2 and melt-kneaded using the twin-screw extruder equipped with the vacuum vent TEX30α (L/D=45) manufactured by the Japan Steel Works, LTD. The twin-screw extruder had a screw arrangement having two elongational flow zones, a ratio of the elongational flow zones to the overall screw length of 29%, three kneading portions, a ratio of the kneading portions to the overall screw length of 45%, and the cylinder temperature set to 320° C. This kneading method is called method F. The melt-kneaded mixture was then pelletized by a strand cutter. The obtained pellets were dried at 130° C. overnight and then injection molded. A resulting molded product was evaluated by the morphology observation, the tensile test, the heat resistance test, the chemical resistance test, the bending test, the welding test and the surface smoothness test.

Example 11

The PPS resin, the fluororesin and the organosilane compound shown in Table 3 were dry-blended at the ratio shown in Table 3 and melt-kneaded using the twin-screw extruder equipped with the vacuum vent TEX30α (L/D=45) manufactured by the Japan Steel Works, LTD. The twin-screw extruder had a screw arrangement having two elongational flow zones, a ratio of the elongational flow zones to the overall screw length of 10%, three kneading portions, a ratio of the kneading portions to the overall screw length of 35%, a ratio of a stirring screw portion with a notch to the overall screw length of 10%, and the cylinder temperature set to 320° C. This kneading method is called method G. The melt-kneaded mixture was then pelletized by a strand cutter. The obtained pellets were dried at 130° C. overnight and then injection molded. A resulting molded product was evaluated by the morphology observation, the tensile test, the heat resistance test, the chemical resistance test, the bending test, the welding test and the surface smoothness test.

Comparative Examples 1 and 4

The PPS resin, the fluororesin and the organosilane compound shown in Table 4 were dry-blended at the ratios shown in Table 4 and melt-kneaded using the twin-screw extruder equipped with the vacuum vent TEX30α (L/D=45) manufactured by the Japan Steel Works, LTD. The twin-screw extruder had no elongational flow zone, three kneading portions, a ratio of the kneading portions to the overall screw length of 45%, and the cylinder temperature set to 320° C. This kneading method is called method B. The melt-kneaded mixture was then pelletized by a strand cutter. The obtained pellets were dried at 130° C. overnight and then injection molded. A resulting molded product was evaluated by the morphology observation, the tensile test, the heat resistance test, the chemical resistance test, the bending test, the welding test and the surface smoothness test.

Comparative Examples 2 and 3

The PPS resin, the fluororesin and the organosilane compound shown in Table 4 were dry-blended at the ratios shown in Table 4 and melt-kneaded using the twin-screw extruder equipped with the vacuum vent TEX30α (L/D=45) manufactured by the Japan Steel Works, LTD. The twin-screw extruder had no elongational flow zone, three kneading portions, a ratio of the kneading portions to the overall screw length of 45%, a ratio of a stirring screw portion with a notch to the overall screw length of 10%, and the cylinder temperature set to 320° C. This kneading method is called method C. The melt-kneaded mixture was then pelletized by a strand cutter. The obtained pellets were dried at 130° C. overnight and then injection molded. A resulting molded product was evaluated by the morphology observation, the tensile test, the heat resistance test, the chemical resistance test, the bending test, the welding test and the surface smoothness test.

TABLE 1

|  |  |  |  | EX 1 | EX 2 | EX 3 | EX 4 | EX 5 |
|---|---|---|---|---|---|---|---|---|
| Composition | PPS resin (a) | a-1 | parts by weight | 100 | 100 | 100 | 100 |  |
|  |  | a-2 | parts by weight |  |  |  |  | 100 |
|  |  | a-3 | parts by weight |  |  |  |  |  |
|  | Fluororesin (b) | b-1 | parts by weight |  |  |  | 25 |  |
|  |  | b-2 | parts by weight |  |  |  |  | 100 |
|  |  | b-3 | parts by weight | 25 | 75 | 125 |  |  |
|  |  | b-4 | parts by weight |  |  |  |  |  |
|  | Organosilane compound (c) | c-1 | parts by weight | 1 | 1 | 1 |  | 1 |
|  |  | c-2 | parts by weight |  |  |  | 1.3 |  |
|  | Melt kneading method |  |  | A | A | A | A | A |
| Dispersed state | Number-average dispersion diameter of primary dispersed phase |  | μm | 0.6 | 0.7 | 0.8 | 1.0 | 1.0 |
|  | Presence or absence of secondary dispersed phase |  | — | Present | Present | Present | Present | Present |
| Physical properties | Tensile strength |  | MPa | 77 | 53 | 39 | 75 | 45 |
|  | Tensile elongation |  | % | 137.8 | 75.1 | 20.3 | 22.3 | 23.0 |
|  | Tensile elongation after treatment at 200° C. × 500 h |  | % | 27.5 | 22.5 | 15.3 | 11.5 | 13.2 |
|  | Tensile elongation after ATF soaking treatment |  | % | 35.0 | 31.5 | 19.0 | 13.9 | 16.3 |
|  | Bending elastic modulus |  | GPa | 3.1 | 2.2 | 1.6 | 3.2 | 2.2 |
|  | Bending strength |  | MPa | 109 | 91 | 72 | 105 | 62 |
|  | Weld strength |  | MPa | 63 | 41 | 30 | 60 | 43 |
|  | Weld elongation |  | % | 15.1 | 10.3 | 5.6 | 5.3 | 5.4 |
|  | Center line average roughness |  | μm | 0.07 | 0.08 | 0.25 | 0.55 | 0.85 |

TABLE 2

|  |  |  |  | EX 6 | EX 7 | EX 8 | EX 9 | EX 10 |
|---|---|---|---|---|---|---|---|---|
| Composition | PPS resin (a) | a-1 | parts by weight |  |  | 100 | 100 | 100 |
|  |  | a-2 | parts by weight | 100 |  |  |  |  |
|  |  | a-3 | parts by weight |  | 100 |  |  |  |
|  | Fluororesin (b) | b-1 | parts by weight |  |  |  |  |  |
|  |  | b-2 | parts by weight |  |  |  |  |  |
|  |  | b-3 | parts by weight | 25 | 25 | 75 | 75 | 75 |
|  |  | b-4 | parts by weight |  |  |  |  |  |

TABLE 2-continued

|  |  |  | EX 6 | EX 7 | EX 8 | EX 9 | EX 10 |
|---|---|---|---|---|---|---|---|
|  | Organosilane compound (c) c-1 | parts by weight | 1 | 1 | 1 | 1 | 1 |
|  | c-2 | parts by weight |  |  |  |  |  |
|  | Melt kneading method |  | A | A | D | E | F |
| Dispersed state | Number-average dispersion diameter of primary dispersed phase | μm | 0.4 | 1.0 | 1.0 | 1.0 | 1.0 |
|  | Presence or absence of secondary dispersed phase | — | Present | Present | Present | Present | Present |
| Physical properties | Tensile strength | MPa | 79 | 74 | 52 | 53 | 54 |
|  | Tensile elongation | % | 140.5 | 25.0 | 45.0 | 21.0 | 28.0 |
|  | Tensile elongation after treatment at 200° C. × 500 h | % | 27.3 | 13.1 | 15.2 | 10.5 | 14.0 |
|  | Tensile elongation after ATF soaking treatment | % | 33.5 | 15.9 | 16.0 | 11.5 | 13.0 |
|  | Bending elastic modulus | GPa | 3.1 | 3.1 | 2.2 | 2.2 | 2.2 |
|  | Bending strength | MPa | 107 | 104 | 92 | 91 | 89 |
|  | Weld strength | MPa | 60 | 63 | 29 | 30 | 30 |
|  | Weld elongation | % | 12.5 | 4.7 | 5.2 | 5.3 | 5.2 |
|  | Center line average roughness | μm | 0.07 | 0.09 | 0.25 | 0.23 | 0.45 |

TABLE 3

|  |  |  |  | EX 11 | EX 12 | EX 13 | EX 14 | EX 15 |
|---|---|---|---|---|---|---|---|---|
| Composition | PPS resin (a) | a-1 | parts by weight | 100 | 100 | 100 | 100 | 100 |
|  |  | a-2 | parts by weight |  |  |  |  |  |
|  |  | a-3 | parts by weight |  |  |  |  |  |
|  | Fluororesin (b) | b-1 | parts by weight |  |  |  |  |  |
|  |  | b-2 | parts by weight |  |  |  |  |  |
|  |  | b-3 | parts by weight | 75 | 75 |  | 100 | 140 |
|  |  | b-4 | parts by weight |  |  | 75 |  |  |
|  | Organosilane compound (c) | c-1 | parts by weight | 1 |  | 1 | 1 | 1 |
|  |  | c-2 | parts by weight |  | 1 |  |  |  |
|  | Melt kneading method |  |  | G | A | A | A | A |
| Dispersed state | Number-average dispersion diameter of primary dispersed phase | μm |  | 1.0 | 0.9 | 0.7 | 0.7 | 1.0 |
|  | Presence or absence of secondary dispersed phase | — |  | Present | Present | Present | Present | Present |
| Physical properties | Tensile strength | MPa |  | 53 | 51 | 49 | 46 | 36 |
|  | Tensile elongation | % |  | 31.0 | 20.2 | 19.8 | 40.5 | 20.1 |
|  | Tensile elongation after treatment at 200° C. × 500 h | % |  | 13.1 | 12.3 | 13.0 | 20.1 | 15.0 |
|  | Tensile elongation after ATF soaking treatment | % |  | 11.3 | 10.3 | 12.1 | 30.5 | 18.0 |
|  | Bending elastic modulus | GPa |  | 2.2 | 2.2 | 2.1 | 1.9 | 1.5 |
|  | Bending strength | MPa |  | 90 | 90 | 88 | 81 | 65 |
|  | Weld strength | MPa |  | 31 | 29 | 28 | 36 | 29 |
|  | Weld elongation | % |  | 5.0 | 4.9 | 4.9 | 4.8 | 5.2 |
|  | Center line average roughness | μm |  | 0.50 | 0.52 | 0.12 | 0.13 | 0.40 |

TABLE 4

|  |  |  |  | COMP EX 1 | COMP EX 2 | COMP EX 3 | COMP EX 4 | COMP EX 5 |
|---|---|---|---|---|---|---|---|---|
| Composition | PPS resin (a) | a-1 | parts by weight | 100 |  |  |  |  |
|  |  | a-2 | parts by weight |  | 100 | 100 | 100 | 100 |
|  |  | a-3 | parts by weight |  |  |  |  |  |
|  | Fluororesin (b) | b-1 | parts by weight | 25 |  |  |  |  |
|  |  | b-2 | parts by weight |  | 100 | 100 |  |  |
|  |  | b-3 | parts by weight |  |  |  | 11 | 25 |
|  |  | b-4 | parts by weight |  |  |  |  |  |
|  | Organosilane compound (c) | c-1 | parts by weight |  |  | 1 | 1.7 |  |
|  |  | c-2 | parts by weight | 1.3 |  |  |  |  |
|  | Melt kneading method |  |  | B | C | C | B | A |

TABLE 4-continued

|  |  |  | COMP EX 1 | COMP EX 2 | COMP EX 3 | COMP EX 4 | COMP EX 5 |
|---|---|---|---|---|---|---|---|
| Dispersed state | Number-average dispersion diameter of primary dispersed phase | μm | 1.0 | 5.9 | 4.5 | 0.7 | 5.0 |
|  | Presence or absence of secondary dispersed phase | — | Absent | Present | Present | Absent | Absent |
| Physical properties | Tensile strength | MPa | 73 | 37 | 41 | 84 | 71 |
|  | Tensile elongation | % | 11.5 | 5.1 | 6.1 | 105.0 | 4.5 |
|  | Tensile elongation after treatment at 200° C. × 500 h | % | 6.4 | 1.5 | 2.3 | 19.0 | 1.3 |
|  | Tensile elongation after ATF soaking treatment | % | 7.3 | 2.3 | 3.4 | 23.0 | 2.3 |
|  | Bending elastic modulus | GPa | 3.2 | 2.2 | 2.2 | 3.1 | 3.1 |
|  | Bending strength | MPa | 103 | 59 | 58 | 110 | 105 |
|  | Weld strength | MPa | 26 | 17 | 21 | 29 | 29 |
|  | Weld elongation | % | 1.5 | 0.8 | 0.9 | 1.3 | 1.3 |
|  | Center line average roughness | μm | 1.55 | 1.50 | 3.13 | 1.36 | 2.84 |

The following describes the results of Examples and Comparative Examples above.

In Examples 1 to 15, the number-average dispersion particle diameter of the dispersed phase of the fluororesin (b) is controlled to be not greater than 1 μm, and the secondary dispersed phase of the PPS resin as the primary component is formed in the primary dispersed phase of the fluororesin. This provides the low elastic modulus, the sufficient flexibility, and the good tensile elongation and good weld elongation. This also provides the good center line average roughness as the indication of the surface smoothness.

In Comparative Example 1, melt-kneading the mixture under the condition of no elongational flow zone, on the other hand, the dispersed phase of the fluororesin has the number-average dispersion diameter of not greater than 1 μm, but formation of any secondary dispersed phase is not observed. The physical properties of the obtained molded product show insufficient tensile elongation and insufficient weld elongation. This comparative example does not provide the PPS resin composition having good toughness. Furthermore, this comparative example has poor center line average roughness.

In Comparative Example 2 and 3, using the stirring screw with the notch for melt kneading, formation of the secondary dispersed phase of the PPS resin is observed in the primary dispersed phase of the fluororesin, but the primary dispersed phase has a coarse number-average dispersion diameter (4.3 to 6.1 μm). The mechanical properties of the obtained molded product show insufficient tensile elongation and insufficient weld elongation. This comparative example does not provide the PPS resin composition having good toughness. Furthermore, this comparative example has poor center line average roughness.

In Comparative Example 4, melt-kneading the mixture under the condition of no elongational flow zone, the dispersed phase of the fluororesin has the number-average dispersion diameter of not greater than 1 μm, but formation of any secondary dispersed phase is not observed. The physical properties of the obtained molded product show good tensile elongation but insufficient weld elongation. This comparative example also has poor center line average roughness. Although the mechanism is unclear, the melt kneading conditions are expected to change the compatibility between the PPS resin and the fluororesin and affect formation of the secondary dispersed phase and the weld characteristics.

In Comparative Example 5 without using any organosilane compound, a coarse dispersed phase of the fluororesin is formed, and formation of any secondary dispersed phase is not observed. The physical properties of the obtained molded product show insufficient tensile elongation and insufficient weld elongation. This comparative example does not provide the PPS resin composition having good toughness. Furthermore, this comparative example has poor center line average roughness.

The invention claimed is:

1. A polyphenylene sulfide resin composition obtained by mixing a polyphenylene sulfide resin (a), a fluororesin (b) and an organosilane compound (c), wherein
when a resin phase-separated structure of a molded product formed from the polyphenylene sulfide resin composition is observed by an electron microscope, the component (a) forms a continuous phase, the component (b) forms a primary dispersed phase having a number-average dispersion diameter of not greater than 1 μm, and a secondary dispersed phase of the component (a) is included in the primary dispersed phase of the component (b).

2. The polyphenylene sulfide resin composition according to claim 1, wherein the component (b) is a reactive functional group-containing fluororesin.

3. The polyphenylene sulfide resin composition according to claim 1, wherein the component (b) is an ethylene tetrafluoroethylene copolymer.

4. The polyphenylene sulfide resin composition according to claim 1, wherein the component (a) is a carboxyl group-containing polyphenylene sulfide resin having a content of a carboxyl group not lower than 25 μmol/g and not higher than 400 μmol/g.

5. The polyphenylene sulfide resin composition according to claim 1, wherein the component (a) has a weight-average molecular weight not less than 30000 and not greater than 150000.

6. The polyphenylene sulfide resin composition according to claim 1, wherein the component (c) is an isocyanate group-containing organosilane compound.

7. A method of manufacturing the polyphenylene sulfide resin composition according to claim 1, comprising:
melting and kneading the component (a), the component (b) and the component (c) with a twin-screw extruder that has a ratio of a total length of elongational flow zones for melt kneading with elongational flow to an overall length of a screw of the twin-screw extruder not lower than 3% and not higher than 20%.

8. The method according to claim 7, wherein a difference between a pressure difference before the elongational flow zone and a pressure difference in the elongational flow zone is not lower than 10 kg/cm² and not higher than 1000 kg/cm².

9. The polyphenylene sulfide resin composition according to claim 2, wherein the component (b) is an ethylene tetrafluoroethylene copolymer.

10. The polyphenylene sulfide resin composition according to claim 2, wherein the component (a) is a carboxyl group-containing polyphenylene sulfide resin having a content of a carboxyl group not lower than 25 μmol/g and not higher than 400 μmol/g.

11. The polyphenylene sulfide resin composition according to claim 3, wherein the component (a) is a carboxyl group-containing polyphenylene sulfide resin having a content of a carboxyl group not lower than 25 μmol/g and not higher than 400 μmol/g.

12. The polyphenylene sulfide resin composition according to claim 2, wherein the component (a) has a weight-average molecular weight not less than 30000 and not greater than 150000.

13. The polyphenylene sulfide resin composition according to claim 3, wherein the component (a) has a weight-average molecular weight not less than 30000 and not greater than 150000.

14. The polyphenylene sulfide resin composition according to claim 4, wherein the component (a) has a weight-average molecular weight not less than 30000 and not greater than 150000.

15. The polyphenylene sulfide resin composition according to claim 2, wherein the component (c) is an isocyanate group-containing organosilane compound.

16. The polyphenylene sulfide resin composition according to claim 3, wherein the component (c) is an isocyanate group-containing organosilane compound.

17. The polyphenylene sulfide resin composition according to claim 4, wherein the component (c) is an isocyanate group-containing organosilane compound.

18. The polyphenylene sulfide resin composition according to claim 5, wherein the component (c) is an isocyanate group-containing organosilane compound.

19. A method of manufacturing the polyphenylene sulfide resin composition according to claim 2, comprising:

melting and kneading the component (a), the component (b) and the component (c) with a twin-screw extruder that has a ratio of a total length of elongational flow zones for melt kneading with elongational flow to an overall length of a screw of the twin-screw extruder not lower than 3% and not higher than 20%.

20. A method of manufacturing the polyphenylene sulfide resin composition according to claim 3, comprising:

melting and kneading the component (a), the component (b) and the component (c) with a twin-screw extruder that has a ratio of a total length of elongational flow zones for melt kneading with elongational flow to an overall length of a screw of the twin-screw extruder not lower than 3% and not higher than 20%.

* * * * *